(12) United States Patent
Tabata

(10) Patent No.: US 6,324,001 B2
(45) Date of Patent: *Nov. 27, 2001

(54) STEREO IMAGE DISPLAY APPARATUS

(75) Inventor: Seiichiro Tabata, Hino (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/865,187

(22) Filed: May 29, 1997

(30) Foreign Application Priority Data

May 29, 1996 (JP) .................................................. 8-157577

(51) Int. Cl.$^7$ .......................... G02B 27/22; H04N 13/04; G09G 5/00

(52) U.S. Cl. ............................. 359/462; 359/464; 348/51; 345/112

(58) Field of Search ..................................... 359/462, 464; 348/47, 51, 42, 54; 345/112; 351/201

(56) References Cited

U.S. PATENT DOCUMENTS 5,801,760 * 9/1998 Uomori .................................. 348/47
5,825,456 * 10/1998 Tabata et al. ......................... 351/201

* cited by examiner

*Primary Examiner*—Audrey Chang
(74) *Attorney, Agent, or Firm*—Pillsbury Winthrop LLP

(57) ABSTRACT

A stereo image display apparatus is disclosed, in which the influence of display area edge portions on the viewing of stereo image is taken into considerations to enable display of stereo images without spoiling the viewer's sense just like the viewer is actually on the site of the image scene. The display of a left eye and a right eye image is controlled to have a binocular parallax substantially fixed in effect. (Specifically, image shifters 32L and 32R shift the left eye and right eye images according to a parallax signal.) Edge portions of a left eye and a right eye image display area are shaded off in effect and made obscure by a left eye and a right eye eyepiece optical system 12L and 12R.

4 Claims, 25 Drawing Sheets

COMPLEXED IMAGE

WINDOW

IMAGE SIGNAL

SPATIAL FREQUENCY

SIMPLE IMAGE

WINDOW

IMAGE SIGNAL

SPATIAL FREQUENCY

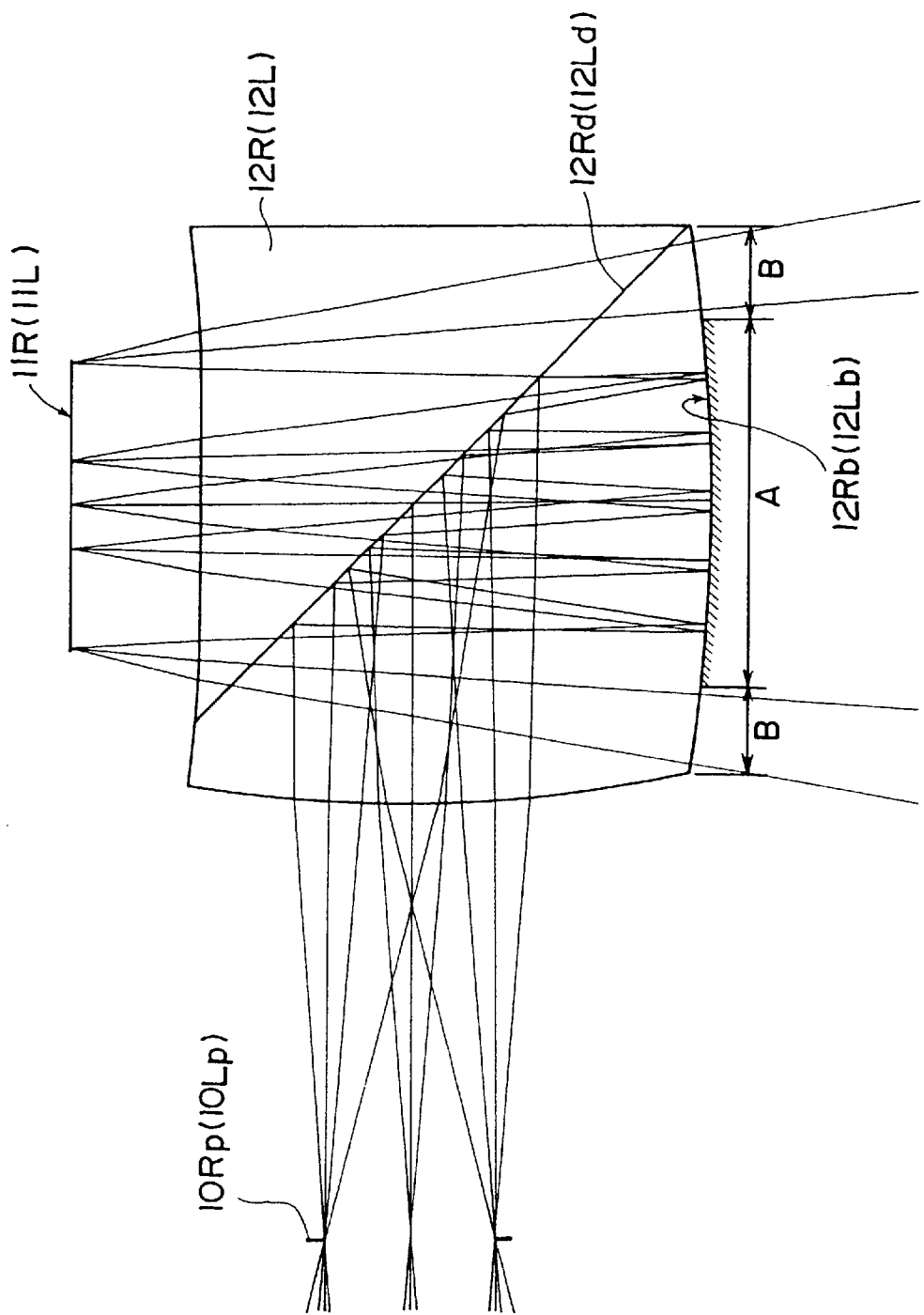

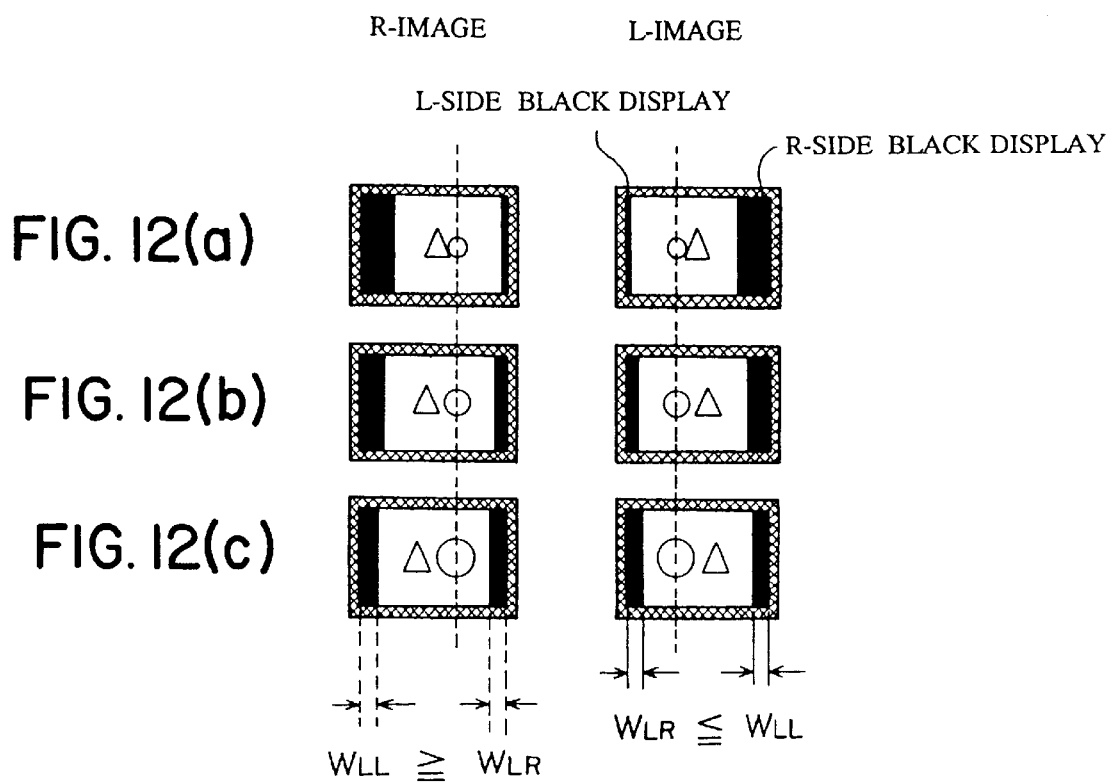

FIG. 16
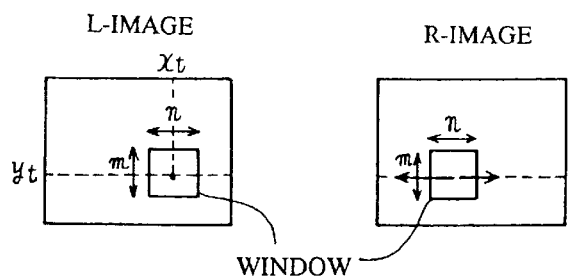
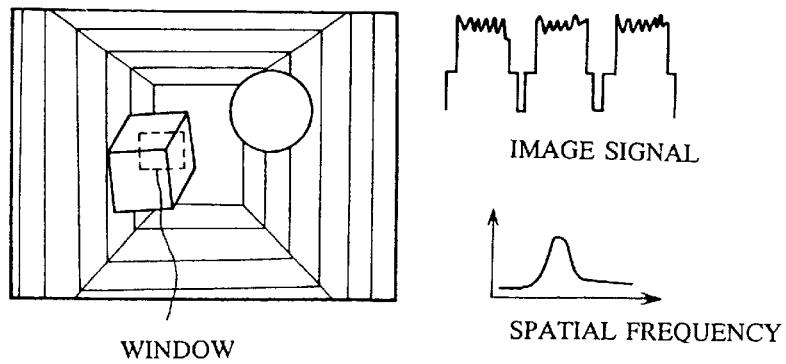
FIG. 17(a)
COMPLEXED IMAGE
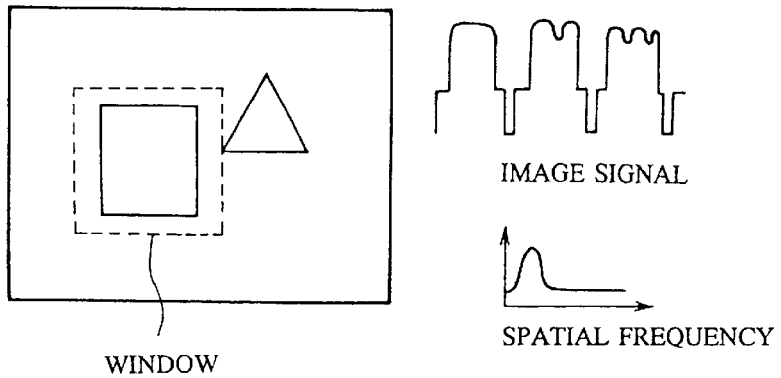
FIG. 17(b)
SIMPLE IMAGE L-IMAGE    R-IMAGE
FIG. 19(a) 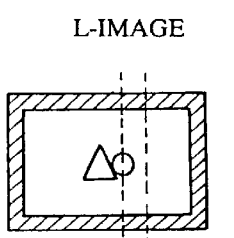 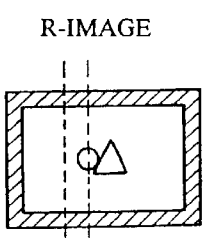
LCD FRAME
FIG. 19(b) 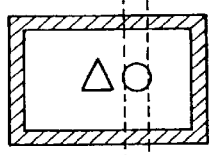 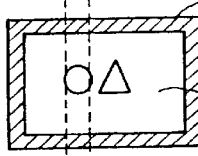
DISPLAY SURFACE
FIG. 19(c) 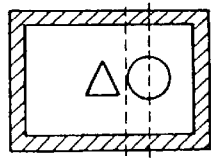 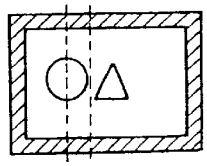

STEREO IMAGE DISPLAY APPARATUS

BACKGROUND OF THE INVENTION

1. Field of the Invention

The present invention relates to stereo image display apparatuses capable of displaying stereo images to the viewer with left eye and right eye images with a binocular parallax and, more particularly, to improvements in the stereo image display apparatus for alleviating the departure from the natural sense of viewing and fatigue of the viewer viewing stereo image.

2. Discussion of the Related Art

As visual display apparatuses or systems, various stereo image display apparatuses for displaying images viewed as stereo image have been proposed.

FIG. 18 is a perspective view showing a head-mounted display (HMD) 700 as an example of such stereo image display apparatus. The illustrated HMD 700 is a binocular stereo display. The HMD 700 has a frame 702, which is mounted on the viewer's head and supports a left and a right display element and also a left and a right enlarging optical system 701 in front of the viewer's left and right eyes. Thus, a left eye image is displayed to the left eye, while a right eye is displayed to the right eye, whereby the viewer can view the image as a stereo image. The frame 702 has a sensor support 703 supporting a head motion sensor 704, which is located on the head and detects motion of the head. Thus, the viewer can view the image in correspondence to the motion of his or her head. A data processor 720 is connected via a cable 722 to a connector 706, which is supported on a connector support 705 provided on the frame 702. A loudspeaker 709 for outputting sound is provided in each air. The data processor 720 has operating buttons 720a which are operable by the user for various operations. With the usual stereo image display apparatus such as the HMD, the viewing distance and the verging distance fail to coincide with each other, as will be described later in detail, thus resulting in a departure from the natural sense of viewing.

FIGS. 19(a) to 19(c) are views for describing how a left eye image and a right eye image are viewed as a stereo image in the stereo image display apparatus. These figures show an example of a stereo image viewed by the left and right eyes. The image includes two objects, i.e., a sphere and a triangle pyramid, the sphere becoming closer to the viewer. In this case, the left eye and right eye images are changed from those shown in FIG. 19(a) to those shown in FIG. 19(b) and then to those shown in FIG. 19(c). As shown, the sphere is moved toward the center while being gradually increased in size. This means that the binocular parallax is being gradually increased.

FIG. 20 shows the way in which the images shown in FIGS. 19(a) to 19(c) are viewed with the two eyes. Increasing binocular parallax leads to verging for merging, (i.e., reaching or going to reach a viewer's state of perceiving one image on the basis of a plurality of images), so that the viewer's eyeballs are turned inward. This rotation of the eyes is called vergence, and the angle of the rotation is called vergence angle in the illustrated definition. Also, the distance between the optical axes of the eyeballs in vergence and each eye is called parallax distance. In the HMD, the parallax distance is equal to the distance between the point of intersection of the main beans of the left and right images and the main plane of the eyepiece optical system. Thus the vergence of the eyeballs immediately causes accommodation. With increasing vergence angle, the accommodation tends to be closer. Conversely, with reducing the vergence angle, the accommodation tends to be further apart. In the stereo image display, the plane in which image can be viewed with the best contrast is fixed. In the HMD, the distance from this plane to each eyeball is the viewing distance. In this connection, inconsistency has heretofore taken place. Specifically, the above phenomenon occurs not only in the HMD but also in various stereo television sets, such as those of a shutter switching system, a lenticular system, etc. In these systems, the viewing distance of stereo television is the distance from the display surface of the display such as a CRT, to each eyeball of the viewer.

Viewing an image with great verging distance changes as a stereo image in a state that the viewing distance and the verging distance do not coincide, leads to unnatural viewing. This problem may be avoided by producing an image with less fly-out changes. Doing so, however, weakens the impact of image as a stereo image.

To solve this problem, Japanese Patent Publication Heisei 6-85590 proposes an HMD, in which the viewing distance is varied according to the image motion or the like through mechanical driving of the eyepiece lens. Japanese Laid-Open Patent Publication Heisei 3-292093 discloses a method of varying the viewing degree by detecting a point viewed by the viewer and moving the lenses according to depth information at the viewed point. These systems permit one to obtain coincidence of the viewing degree and the verging angle with each other.

Japanese Laid-Open Patent Publication Heisei 7-167633 shows a method of controlling the optimum viewing point, which permits the viewer to perceive the depth world of an object in the broadcast range, by calculating the point from the binocular parallax of image, such as the point is reproduced on the surface of a stereo image display unit or at a specified distance from the surface. As a specific means, a parallax map is calculated from left and right images by using a correlation matching map, and then the mean value of parallax of the entire image or weighted mean parallax of a central part of the image is calculated. Using this mean parallax, a parallax controller controls the horizontal read timing of left and right images to cause parallel movement of the image in the horizontal direction. This method does not require any mechanical drive system, and it is thus possible to prevent size increase.

FIGS. 21(a) to 21(c) are views showing left eye and right eye images displayed in a stereo image display apparatus, which was proposed earlier by the inventor (Japanese Patent Application Heisei 8-28856). Like the case of FIGS. 19(a) to 19(c), two objects, i.e., a sphere and a triangular pyramid, are displayed, the sphere becoming closer to the viewer. In this case, the left eye and right eye images are changed from those shown in FIG. 21(a) to those shown in FIG. 21(b) and then to those shown in FIG. 21(c). In this apparatus, the parallax of the left eye and right eye images is substantially fixed irrespective of the motion of the sphere toward and away from the viewer.

FIG. 22 shows the way of viewing of the images shown in FIG. 21 displayed on an HMD with the two eyes. In this case, the verging distance L with respect to the sphere is unchanged although the image of the ball is increased as the ball becomes closer. The triangular pyramid, on the other hand, is moved apart from the viewer although its size is unchanged. In other words, the distance difference between the triangular pyramid and the sphere is increased as in the prior art case. Nevertheless, the verging distance L with respect to the sphere is substantially fixed.

This is owing to the fact that the person's eyes are not so sensitive with respect to the change in the absolute distance although they are sensitive to changes in the relative distance. Experiments conducted by the inventor prove that the viewer viewing a stereo image of only a single object with changing binocular parallax (background being black), cannot perceive distance changes. However, the sense of stereo arises when objects in different motions are displayed simultaneously. This means that it is difficult to recognize a change in the distance of a single object, although changes in the distance between two objects can be recognized. According to the proposal noted above, with the distance difference between the sphere and the triangular pyramid changing as usual and also the sphere changing in size while the triangular pyramid is not, the viewer perceives it as though the sphere is becoming closer to him or her while the triangular pyramid is not changing its position. It is thus possible to provide images with a stereo sense while holding a substantially constant verging distance with respect to the ball. Preferably, the verging distance L of the sphere in FIG. 22 is made coincident with the viewing distance. More preferably, an eye detector judges whether the viewer is viewing the sphere or the triangular pyramid, and the verging distance of the image being viewed is made substantially constant.

FIG. 23 is a view for explaining the status of merging of a stereo image, which is actually displayed on a left and a right display surface. The relation between the binocular parallax and the verging distance L when viewing a stereo image is now considered. With reference to the figure, when merging is attained, the horizontal positions X1 and X2 of the sphere on the left and right display surface when the sphere is viewed to be at a verging distance L and on a horizontal position –H, are respectively driven as equations (1) and (2).

$$X1=\{d+(H)\}/\tan \theta \quad (1)$$

$$X2=\{-d+(-H)\}/\tan \theta \quad (2)$$

In these equations, d is the distance from the mid point between a left and a right lens to each lens (the distance being positive for the right eye and negative for the left eye), and $\theta$ is the half field angle. The horizontal positions X1 and X2 are prescribed as follows.

FIG. 24 is a view showing how the horizontal positions X1 and X2 in FIG. 23 are normalized. As shown in FIG. 24, the normalization is made by setting the horizontal center value of the display region to "0" and the horizontal length of the display region to "2". Equation (1) can be derived from the fact that the triangle with points A to C in FIG. 23 as the apices of the triangle with origin 0 and points X1 and C on the left display surfaces as the apices are similar to each other. Likewise, equation (2) can be derived from the similarity of the triangle with points D, B and E as the apices and the triangle with the origin 0 and points X2 and E on the right display surface to each other.

Equations (1) and (2) can be rearranged into equation (3).

$$|X1-X2|=2d/(L\cdot \tan \theta) \quad (3)$$

In equation (3), the left side |x1–x2| represents the parallax. Equation (3) shows that the verging distance L when the merging is attained is determined independently of the horizontal position H if the parallax is determined.

The permissible change in the verging distance L, i.e., the permissible change in the parallax, will now be considered. FIG. 25 is a graph showing the correspondence relation between accommodation (i.e., state of focus of the eyes) and vergence. The figure shows the permissible range of the vergence accommodation and the parallax ("O Plus E", Seiri Kogaku 15, December 1985, pp. 103). In the graph, the ordinate is taken for the accommodation (parallax) (D: diopter), and the abscissa is taken for the vergence (vergence angle MW). It will be seen from the graph that the vergence is obtainable in a short period of time so log as its changes are within 4 diopters.

In various display apparatuses, it is usual that the frame or an edge part of the display area enters the visual field of the viewer. However, in the system disclosed in the Japanese Laid-Open Patent Publication Heisei 7-167633 and the other prior art techniques described above, as well as some of the apparatuses which were proposed earlier by the inventor, no particular considerations are given to the influence, which is given to the viewer viewing stereo image by the frame of the display area of display means, i.e., the boundary between the display and non-display areas of the display means.

FIG. 26 is a schematic view for describing the influence given to a stereo image viewer by the display area frames (i.e., display area edges) in a display apparatus having a right eye and a left eye image display area.

With reference to FIG. 26, right eye and left eye LCDs 11R and 11L with right eye and left eye image display areas 11Rd and 11Ld, respectively, are provided for the right and left eyes 10R and 10L. Images on the display areas of the LCDs 11R and 11L, are perceived as images of a right eye and a left eye eyepiece optical system 12R and 12L by the viewer through the right and left eyes 10R and 10L.

On the right eye image display area 11Rd of the right eye LCD 11R, a right side image edge and a left side image edge (i.e., boundaries between display and non-display areas) are formed as right and left edges 11Rrr and 11Rrl, respectively. Likewise, on the left eye image display area 11Ld of the left eye LCD 11L, a right side and a left side image edges (i.e., boundaries between display and non-display areas) are formed as a right edge 11Lrr and a left edge 11Lrl.

In the case of FIG. 26, like the case described before in connection with FIG. 22, an image is assumed which contains two objects, i.e., a sphere and a triangular pyramid, the sphere becoming closer to the viewer. The verging distance L with respect to the sphere is unchanged although the image thereof is increased as the sphere is becoming closer. The triangular pyramid, on the other hand, becomes away from the viewer although its size is unchanged. That is, the distance difference between the triangular pyramid and the sphere is being increased while the verging distance L with respect to the sphere is substantially fixed. In such a state, the positions of right edge images 11ir and 11il, which are merged or verged in a binocular visual field formed by the right and left edges 11Rrr and 11Rrl of the right eye LCD 11R and the right and left edges 11Lrr and 11Lrl of the left eye LCD 11L (i.e., the distance between the image of the sphere and the image of the edge), are fixed as shown.

As described before in connection with FIG. 22, the stereo image display system shown in FIG. 26, utilizes the fact as shown in FIG. 22 that the person's eyes are not so sensitive to detect the absolute distance of an object although they are sensitive to relative distance changes. The system thus permits providing an image with a stereo sense as though the viewer sees the sphere becoming closer to him or her while the position of the triangular pyramid is unchanged, while holding the verging distance L with respect to the sphere substantially constant. However, as described before in connection with FIG. 26, in the system of this type the distance between the image of the sphere and the image of the edge is fixed. Therefore, when the viewer sees both the images of the sphere and the edge in his or her visual field, the inconsistency that the relative positions of the image of the sphere which must be becoming closer to the viewer and the image of the image which is fixed in position becomes unconcealed, thus spoiling the stereo sense of the image, i.e., the sense as though the viewer is actually on the site of the image.

In order to evade the problem described before in connection with FIG. 26, it may be thought to move the positions of the right edge images 11ir and 11il merged (or verged) together in the binocular vidual field (i.e., the distance between the images of the sphere and the edge) increased of fixing these positions.

FIG. 27 is a schematic view showing a case, in which the distances of the right and left edges 11Rrr and 11Rrl of the right eye image display area 11Rd of the right eye LCD 11R and the right and left edges 11Lrr and 11Lrl of the left eye image display area 11Ld of the left eye LCD 11L from one another are variable. Increasing the edge-to-edge distance between the two eyes (i.e., between the edges 11Rrl and 11Lrr) is increased as shown in FIG. 27, gives rise to commonly called field struggling when images produced on the right and left LCDs 11R and 11L are to be verged to produce a stereo image.

In the stereo image display apparatus of this type, usually the parallax concerning a left and a right image, is detected from the correlation between the full frames of the left and right images. However, it is not always efficient data processing to compare the full frames of the left and right images unanimously, that is, irrespective of the images (whether the images are thin or coarse) for obtaining the correlation therebetween. On the other hand, imposing a restriction on the images for obtaining the correlation therebetween, may result in an erroneous judgment.

SUMMARY OF THE INVENTION

In view of the problems inherent in the prior art as described above, the present invention has an object of providing a stereo image display apparatus of the pertaining type, which gives due considerations to the influence given to the viewer viewing a stereo image by the edges of the display areas of the display means, i.e., the boundaries (or edges) of the display and non-display areas of the display means, and can display stereo images which do not spoil the sense as though the viewer is actually on the site of the image.

Another object of the present invention is to provide a stereo image display apparatus of the pertaining type, which permits adequate detection of the correlation between a left and a right image in connection with the detection of a parallax concerning these images.

According to a first aspect of the present invention, there is provided a stereo image display apparatus comprising: binocular parallax control means for executing a control operation to vary a right eye and a left eye images with a binocular parallax therebetween such that the binocular parallax is substantially fixed in effect; display means capable of displaying the left eye and right eye images on respective predetermined display areas; and shading-off means for shading off in effect edge portions of the display areas of the left eye and right eye images.

In the prior apparatuses in which the binocular parallax is controlled to be substantially fixed, edge portions of the display areas (i.e., boundary portions between display and non-display areas) are clearly recognized in the visual field. Therefore, the display is unnatural as stereo image display, spoiling the viewer's sense just like the viewer is actually in on the site of the image scene.

According to the first aspect of the present invention, edge portions of the display areas are shaded off in effect and made difficult to be clearly recognized. The display thus has a natural sense as stereo image display, providing enhanced sense of the viewer just like the viewer is actually on the site of the image scene.

In the stereo image display apparatus according to a second aspect of the present invention, the shading-off means in the first aspect includes luminance restricting means for restricting the luminance of edge portions of the left eye and right eye display areas such that the luminance is reduced as one goes toward the edges of the display areas.

According to the second aspect of the present invention, the luminance of the display areas is reduced toward the edges thereof. The edge portions of the display areas are thus shaded off and made difficult to be verged, making the sense about the distance of the display area edge portions unclear. The viewer's sense just like the viewer is actually on the site of the image scene is thus made difficult to be interfered with.

In the stereo image display apparatus according to a third aspect of the present invention, the shading-off means in the first aspect includes resolution restricting optical means for restricting the resolution of edge portions of the left eye and right eye image display areas such that the resolution becomes coarser as one goes toward the edges of the display areas.

According to the third aspect of the present invention, by employing an optical element to make the resolution of the display areas to become gradually coarser toward the edges thereof, the edge portions of the display areas are made difficult to be revolved. The edge portions are thus shaded off and made difficult to be verged, making the distance sense of the display area edge portions unclear. The viewer's sense just like the viewer is actually on the site of the image scene is thus made difficult to be interfered with.

According to a fourth aspect of the present invention, there is provided a stereo image display apparatus comprising: display means capable of displaying left eye and right eye images with a binocular parallax therebetween on respective predetermined display areas; horizontal display position control means for controlling the horizontal display positions of the left eye and right eye images on the left eye and right eye image display areas in opposite directions, respectively; monochrome display area generating means for making the left and right edges and neighborhood thereof of the left eye and right eye image display areas to be predetermined monochrome display areas; and monochrome display area width control means for controlling the width of the monochrome display areas, constituted by the left and right edges and neighborhood thereof of the left eye and right eye image display areas, such as to be increased on the right edge side of the display and reduced on the left edge side thereof when the position of the images on the display areas is shifted to the left, and increased on the left edge side of the display areas and reduced on the right edge side thereof when the position of the images on the display areas is shifted to the right.

With the prior art apparatuses, control of the horizontal display position of the left eye and right eye images in opposite directions results in clear recognition of edge portions of the display areas (i.e., boundaries between image and non-image areas) in the visual field, making the display unnatural as stereo image display. The viewer's sense just like the viewer is actually on the site of the image scene is therefore spoiled.

According to the fourth aspect, in which the widths of the left and right edge portions of the left eye and right eye image display areas can be varied by the monochrome display area, the verging distance of the edges of (or boundaries between) of the monochrome display areas and the rest of the image display areas is varied in effect. It is thus possible to vary the relative distances of the monochrome display areas and the rest of the image display areas, thus making the display natural as stereo image display and enhancing the viewer's sense just like the viewer is actually on the site of the image scene.

In the stereo image display apparatus according to a fifth aspect of the present invention, the monochrome display area generating means in the fourth aspect regulates the width of the monochrome display area constituted by the left edge and neighborhood thereof of the left eye image display area to be greater than the width of the monochrome display area constituted by the right edge and neighborhood thereof of the same display area, and also regulates the width of the monochrome display area constituted by the right edge and neighborhood thereof of the right eye image display area to be greater than the left edge and neighborhood thereof of the same display area.

According to the fifth aspect, the width of the monochrome display area, which is constituted by the left edge and neighborhood thereof of the left eye image display area, is made to be greater than the width of the monochrome display area constituted by the right edge and neighborhood thereof of the same display area, and the width of the monochrome display area constituted by the right edge and neighborhood thereof of the right eye image display area is made to be greater than the monochrome display area constituted by the left edge and neighborhood thereof of the same display area. With this arrangement, verging of the intrinsic image display areas and edge portions thereof can always be obtained to evade the visual field struggling and obtain a satisfactory stereo image display.

In the stereo image display apparatus according to a sixth aspect of the present invention, in the fourth or fifth aspect, the monochrome display area generating means generates black display areas as monochrome display areas.

According to the sixth aspect, when watching stereo pictures in theaters or viewing stereo images on HMDs, the outside of the image display areas are usually dark. By providing black display areas as the monochrome display areas, the edge portions of the image display areas can be made less recognizable as such, thus making it difficult to interfere with the viewer's sense just like the viewer is actually on the site of the image scene.

According to a seventh aspect of the present invention, there is provided a stereo image display apparatus comprising: display means capable of displaying a left eye and a right eye image with a binocular parallax therebetween on respective predetermined display areas; spacial frequency detecting means for detecting a spacial frequency concerning the left eye or right eye image; correlation calculation area specifying means for specifying correlation calculation area according to the spacial frequency detected by the spacial frequency detecting means such that the specified correlation calculation area is the smaller the relatively higher the detected spacial frequency and the greater the relatively lower the detected spacial frequency; correlation calculating means for calculating a correlation of the left eye and right eye images to each other with respect to the correlation calculation area specified by the correlation calculation area specifying means; and binocular parallax control means for controlling the binocular parallax in effect according to the result of the correlation calculation in the correlation calculating means.

According to the seventh aspect, since the area of the window as the subject of the correlation calculation is specified according to the spacial frequencies of images, optimum correlation calculation can be made adaptively in dependence on whether the images are fine or coarse. It is thus possible to improve both the efficiency and accuracy of the correlation detection.

The stereo image display apparatus according to an eighth aspect of the present invention, further comprises viewed point detecting means for detecting a point viewed by the viewer in the display areas of the display means, the spacial frequency detecting means being operable to detect a spacial frequency of images with respect to the viewed point detected by the viewed point detecting means and the neighborhood thereof.

The stereo image display apparatus according to an eighth aspect of the present invention, further comprises viewed point detecting means for detecting a point viewed by the viewer in the display areas of the display means, the spacial frequency detecting means being operable to detect a spacial frequency of images with respect to the viewed point detected by the viewed point detecting means and the neighborhood thereof.

According to the eighth aspect, the spacial frequency of images can be detected within the point viewed by the viewer and the proximity of that point, so that it is possible to provide an inexpensive apparatus.

In the stereo image display apparatus according to a ninth aspect of the present invention, the correlation calculation area specifying means in the eighth aspect specifies the horizontal size of the correlation calculation area to be the smaller the relatively higher a horizontal spacial frequency detected by the spacial frequency detecting means and be the greater the relatively lower the horizontal spacial frequency, and/or specifies the vertical size of the correlation calculation area to be the smaller the relatively higher a vertical spacial frequency detected by the spacial frequency detecting means and be the greater the relatively lower the vertical spacial frequency.

According to the ninth aspect, the horizontal and vertical sizes of the specific area (i.e., window) as the subject of the correlation detection is selected according to both the horizontal and vertical spacial frequencies. An adequate window shape thus can be selected according to the two-dimensional fineness (or coarseness) of images, thus permitting adaptive optical correlation calculation. It is thus possible to improve both the efficiency and accuracy of the correlation detection.

The stereo image display apparatus according to a tenth aspect of the present invention, further comprises edge extracting means for extracting edge portions of at least either of the left eye and right eye images with a binocular parallax therebetween, the spacial frequency detecting means being operable to detect a spacial frequency concerning an image displayed with coupling of edge portions detected by the edge extracting means.

According to the tenth aspect, the spacial frequency detection is made by adopting the simple method of the edge extraction and edge counting. A simple and inexpensive apparatus thus is obtainable compared to the case of the Fourier transform method or the like.

Other objects and features will be clarified from the following description with reference to attached drawings.

BRIEF DESCRIPTION OF THE DRAWINGS

FIG. 7 is an optical path diagram showing a further example of the eyepiece optical system, in which the optical systems shown in FIG. 3 function as shading-off means;

FIGS. 12(a) to 12(c) are views for describing the control operation of the width of masking in the embodiment described before in connection with FIG. 11;

FIG. 16 is a view for describing the operation of determining the area and position of the window in the embodiment shown in FIG. 14;

FIGS. 17(a) and 17(b) are views for describing the operation of the window area determination in the embodiment shown in FIG. 14;

FIGS. 19(a) to 19(c) are views for describing how a left and a right eye images are viewed as stereo image in the stereo image display apparatus;

PREFERRED EMBODIMENTS OF THE INVENTION

Figure 1:
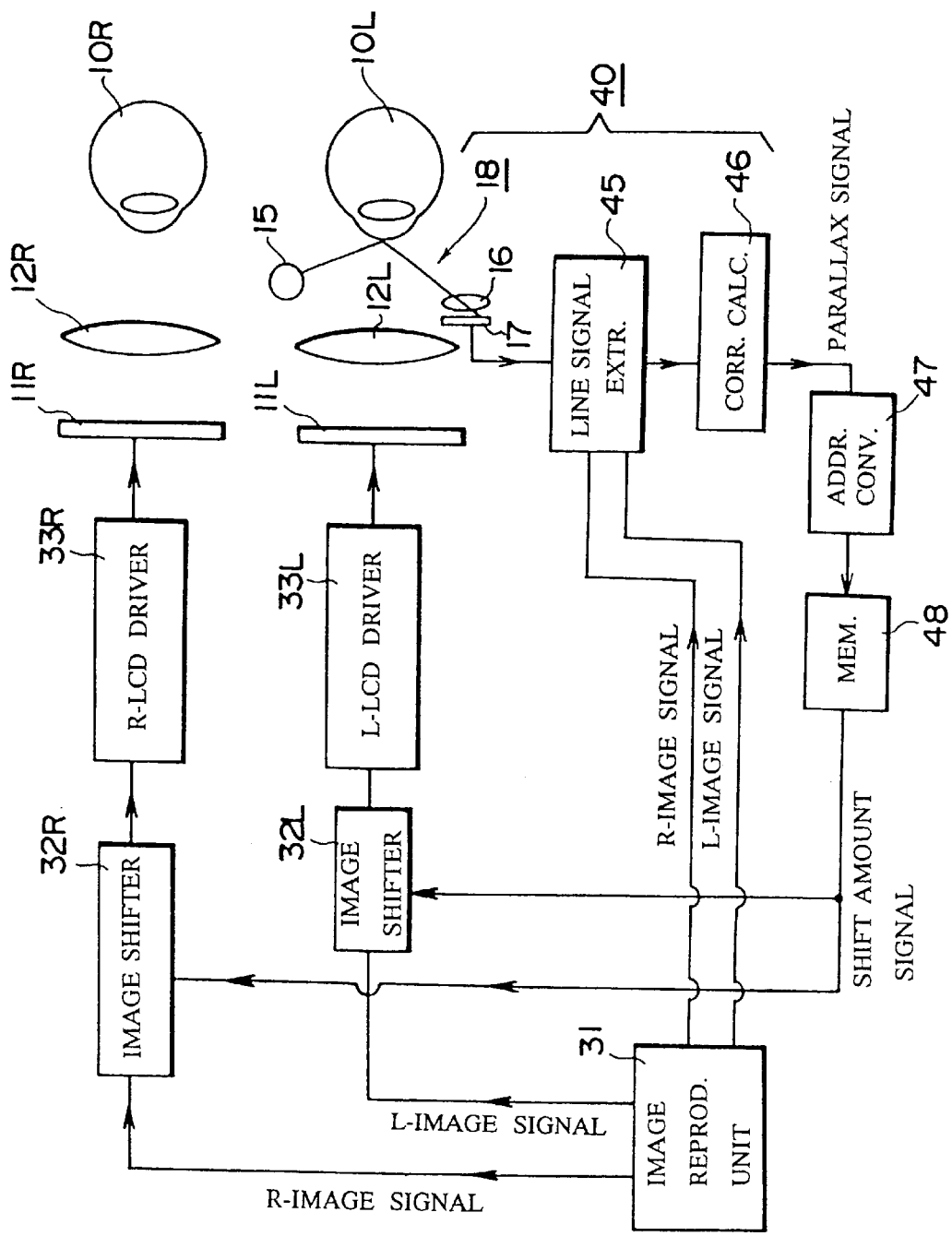
FIG. 1 is a block diagram showing an embodiment of the stereo image display apparatus according to the present invention.
Figure 21:
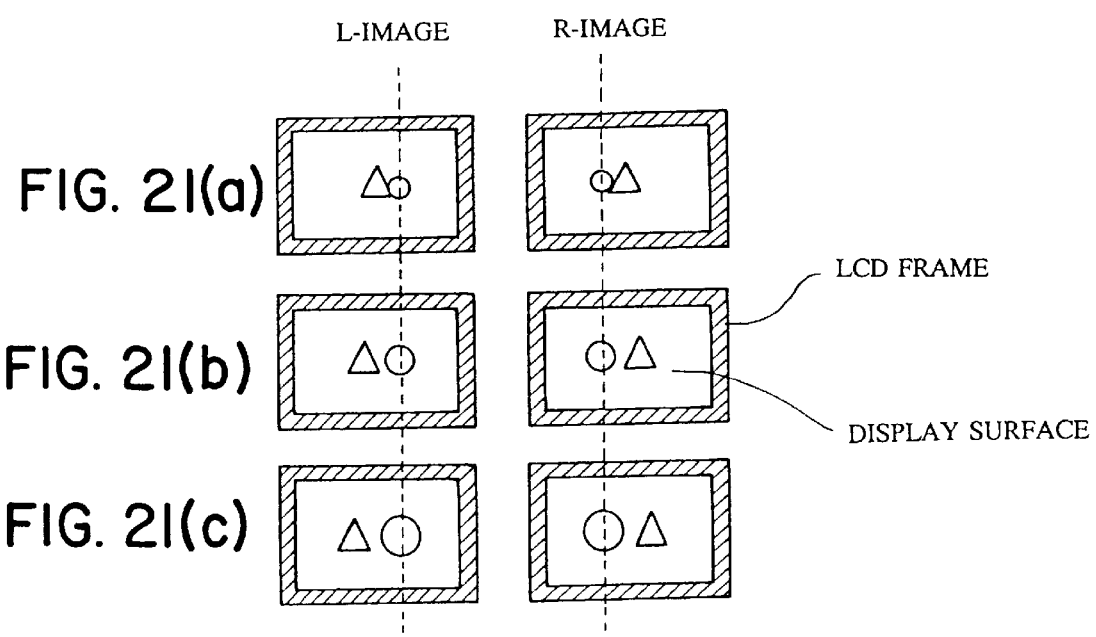
FIGS. 21(a) to 21(c) are views showing left eye and right eye images displayed in a stereo image display apparatus which was proposed earlier.
Figure 22:
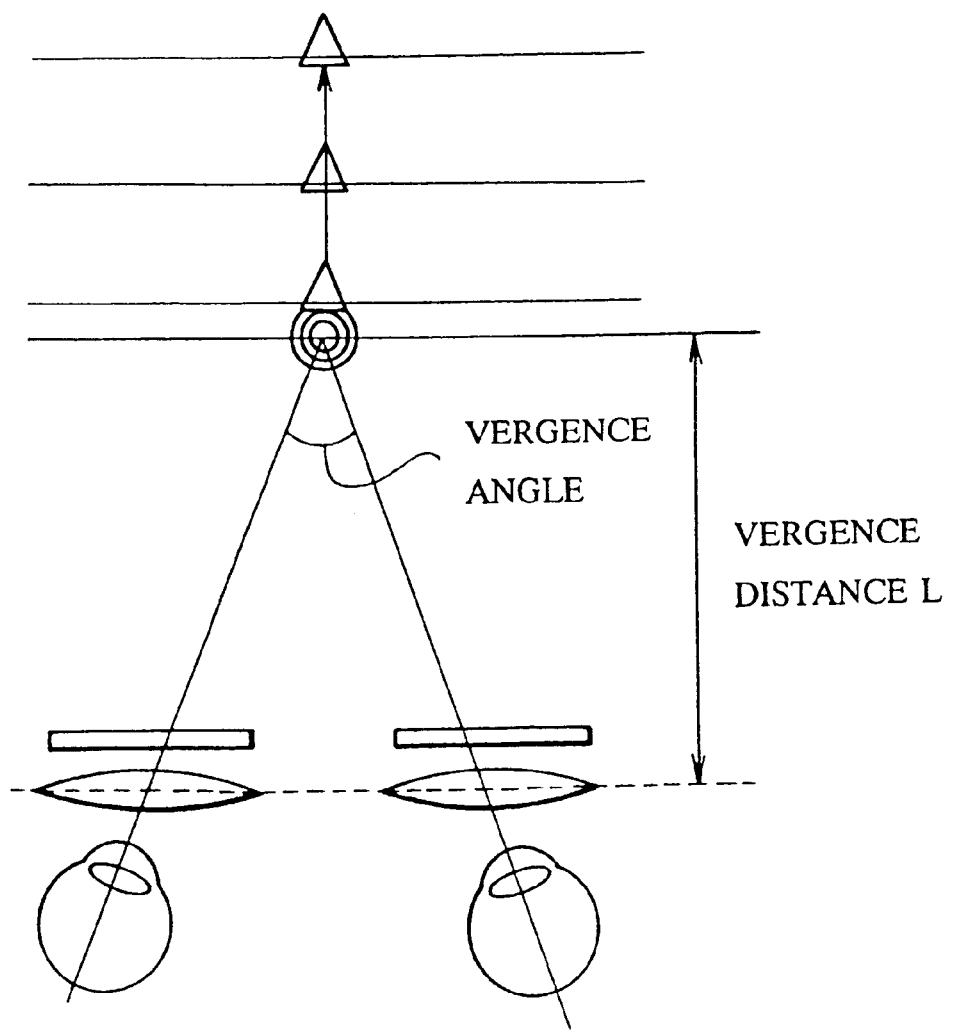
FIG. 22 shows the way of viewing of the images shown in FIG. 21 displayed on an HMD with the two eyes.
Figure 23:
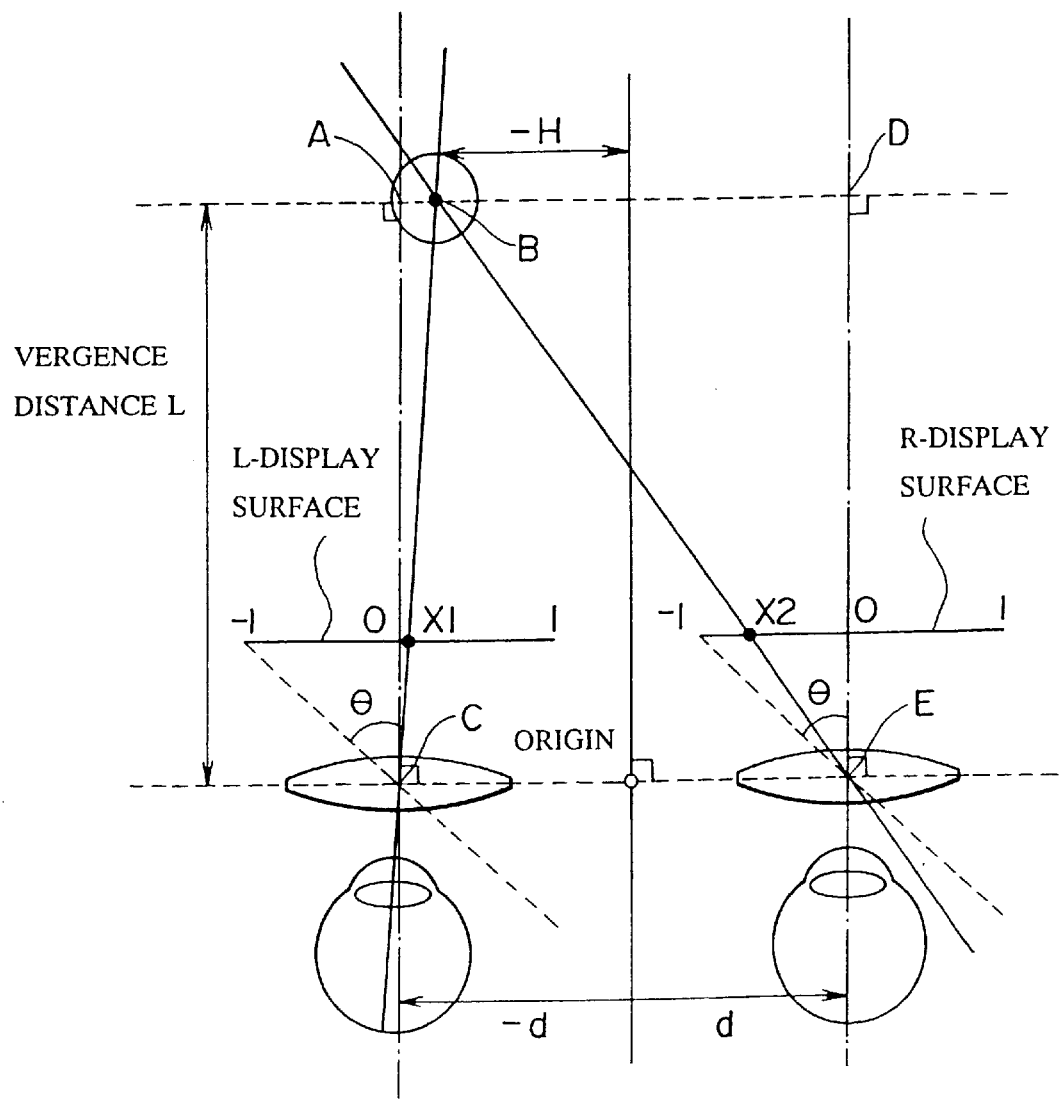
FIG. 23 is a view for explaining the status of merging of stereo image, which is actually displayed on a left and a right display surface.
Figure 24:
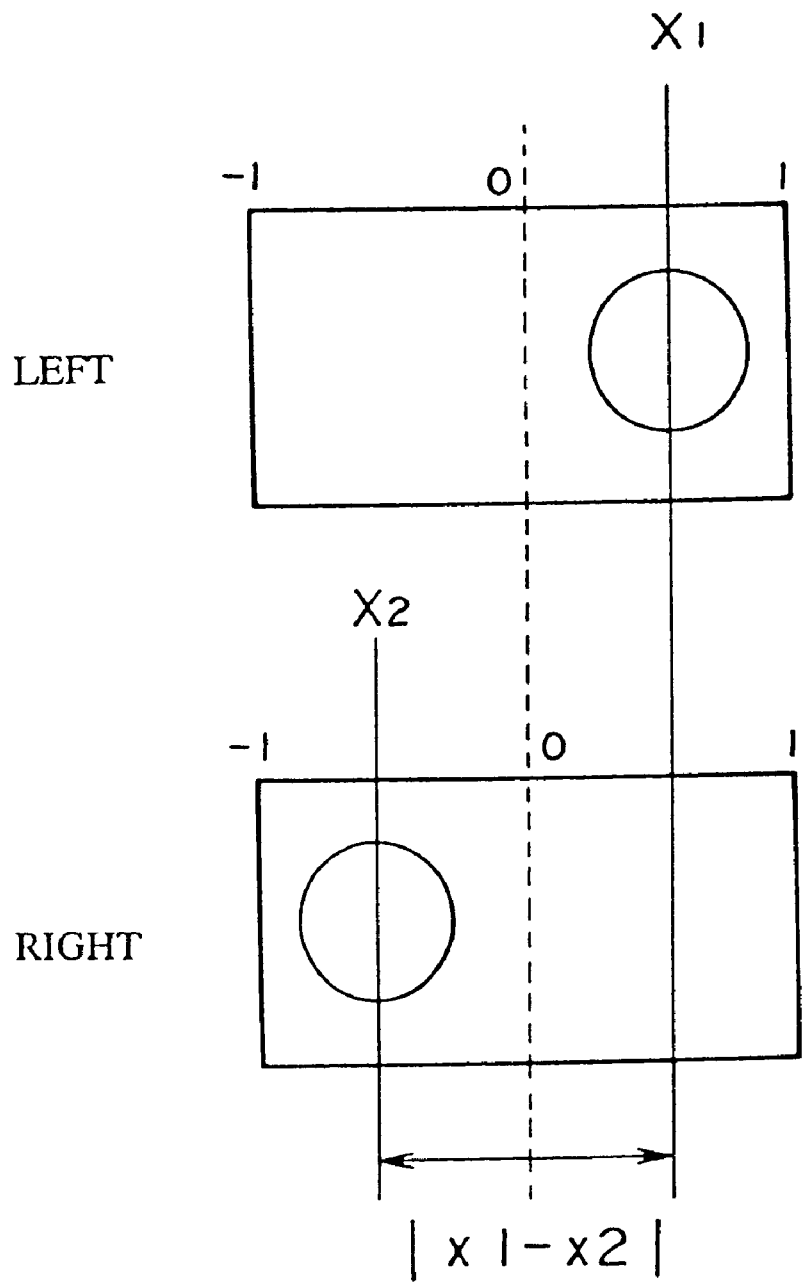
FIG. 24 is a view showing how the horizontal positions X1 and X2 in FIG. 23 are normalized.
Figure 25:
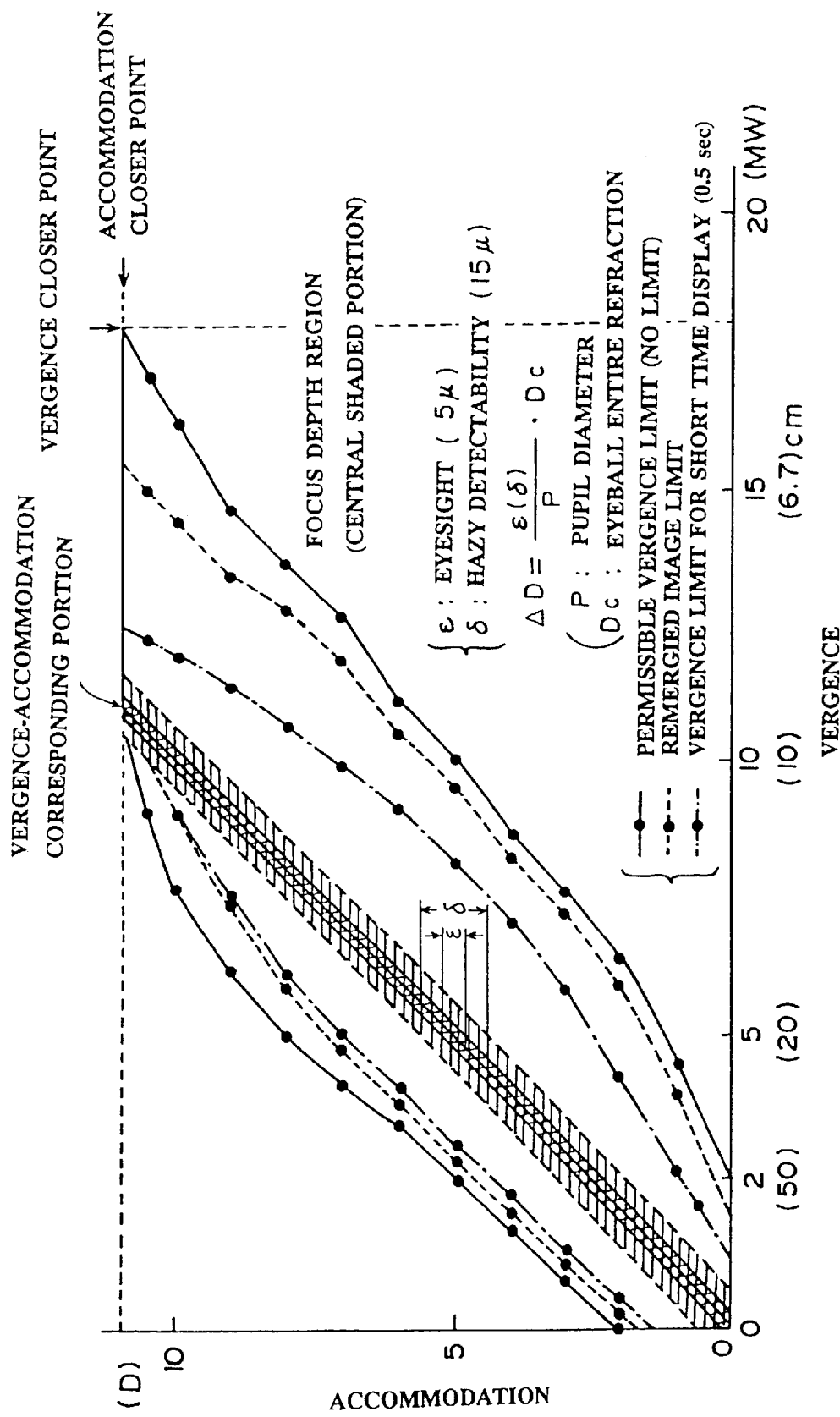
FIG. 25 is a graph showing the correspondence relation between accommodation and vergence.
Figure 26:
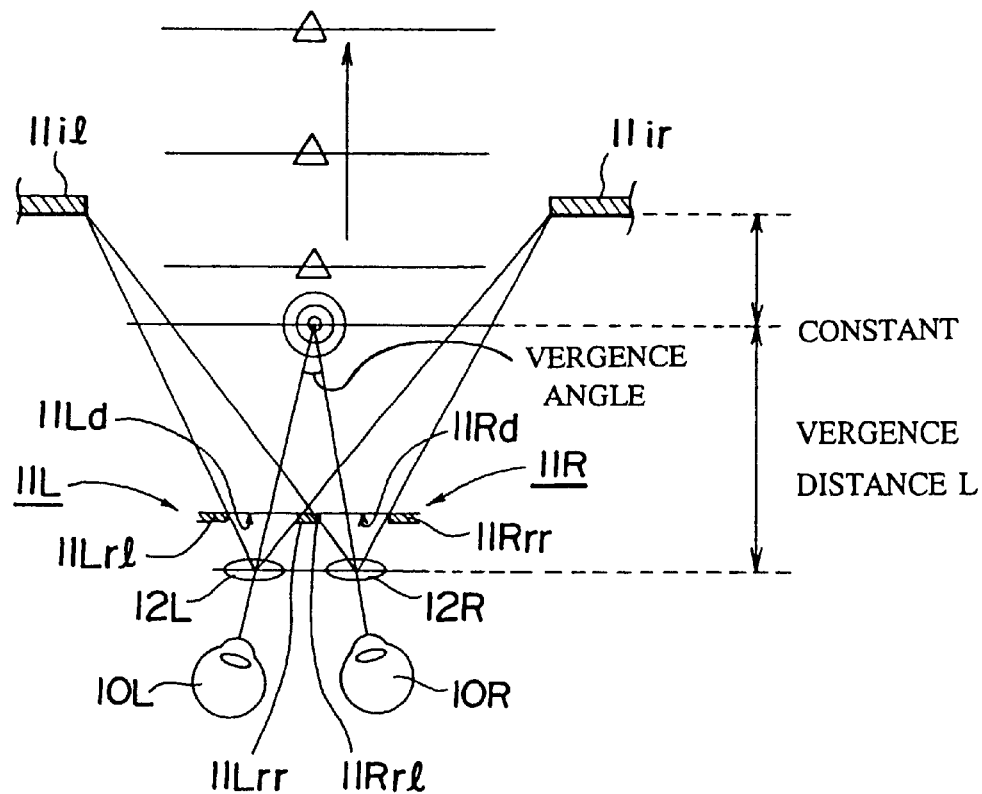
FIG. 26 is a schematic view for describing the influence given to a stereo image viewer by the display area frames (display area edges) in a display apparatus having a right eye and a left eye image display area.
Figure 27:
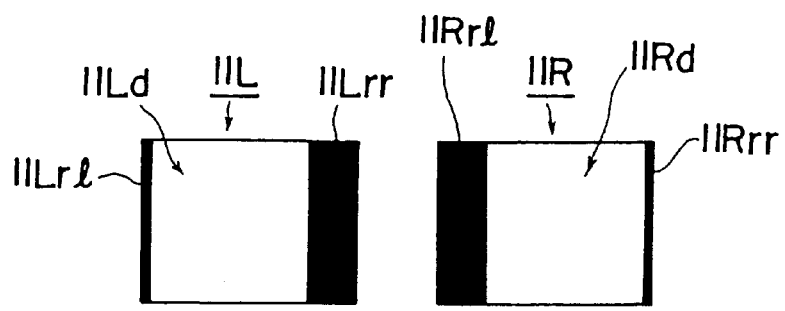
FIG. 27 is a schematic view showing a case, in which the distances of the right and left edges 11Rrr and 11Rrl of the right eye image display area 11Rd of the right eye LCD 11R and the right and left edges 11Lrr and 11Lrl of the left eye image display area 11Ld of the left eye LCD 11L from one another are variable.

FIG. 1 is a block diagram showing an embodiment of the stereo image display apparatus according to the present invention. A right eye and a left eye LCD 11R and 11L having a right eye an d a left eye image display area, respectively, are provided for a right and a left eyes 10R and 10L, respectively. Images on the display areas of the LCDs 11R and 11L are perceived as images produced by a right eye and a left eye eyepiece optical system 12R and 12L by the viewer through the a right and a left eye 10R and 10L. An image reproducing unit 31 reproduces and outputs a stereo image signal representing a stereo image as shown in FIGS. 19(a) to 19(c). A right eye image signal from the image reproducing unit 31 is coupled to an image shifter 32R for conversion to provide a stereo image as shown in FIGS. 21(a) to 21(c) on the right eye LCD 11R. Specifically, the signal is coupled to a right eye LCD driver 33R to display a right eye image on the LCD 11R. Likewise, a left eye image signal from the image reproducing unit 31, for providing the stereo image as shown in FIGS. 21(a) to 21(c), is coupled through an image shifter 32L and a left LCD driver 33L to a left eye LCD 11R for displaying a left eye image thereon.

In the system shown in FIG. 1, an eyesight detector 18 is provided for either of the right and left eyes 10R and 10L (i.e., the left eye 10L in this example) to detect the eyesight from that eye. The eyesight detector 18 includes a photoelectric converting element 17, which receives light from a light source 15 and also reflected right from a eyeball surface reflecting the light from the light source 15.

The eyesight detector 18 provides an eyesight detection signal as its output signal (which is data representing a portion of the image that is viewed by the viewer) to a line signal extractor 45. To the line signal extractor 45 are also coupled the right eye and left eye image signals from the image reproducing unit 31. From each of these signals, the line signal extractor 45 extracts a plurality of horizontal lines centered on the image portion viewed by the viewer, and supplies the extracted signal together with the eyesight detection signal coupled to it to a correlation calculator 46. The correlation calculator 46 calculates a parallax value between the right eye and left eye image signals from the correlation between the extracted pluralities of horizontal lines of signals, and outputs a parallax signal representing the calculated parallax value.

The eyesight detector 18, line signal extractor 45 and correlation calculator 46 together constitute parallax reading means 40, which reads out a parallax concerning the images displayed on the display means on the basis of the right eye and left eye image signals.

The parallax signal outputted from the parallax reading means 40 (the correlation calculator 46), is coupled to an address converter 47. The address converter 47 outputs data representing an address number corresponding to the value of the parallax signal coupled to it. According to the address number data, of data provided in a table in a memory 48 as necessary shift data holding means holding necessary horizontal shift data corresponding to the right eye and left eye images, those which correspond to the above address number are retrieved and outputted from the memory 48. The shift data or shift signals representing necessary shift amounts, which are thus read out, are coupled to the image shifters 32R and 32L, respectively.

The image shifters 32R and 32L execute a signal processing of horizontally shifting the images, which are produced on the right eye and left eye LCDs 11R and 11L by the right eye and left eye image signals from the image reproducing unit 31, by the above necessary shift amounts, thus making the binocular parallax concerning the right eye and left eye images adequate.

The image shifters 32R and 32L, line signal extractor 45, correlation calculator 46 and address converter 47 may be constructed as a single collective digital circuit or as respective separate digital processors or circuits. It is also possible to include the image reproducing unit 31 and the right eye and left eye LCD drivers 33R and 33L either entirely or partly as digital circuit in the data processor or circuit.

In the above case, the horizontal display positions of the viewed image patterns are shifted (together with background) on the right eye and left eye image display areas. Alternatively, it is possible to shift the right eye and left eye image display areas (i.e., the right eye and left eye LCDs 11R and 11L as display devices) as a whole with a result that the horizontal display positions the viewed image patterns displayed on these display areas are shifted (together with background).

Figure 2:
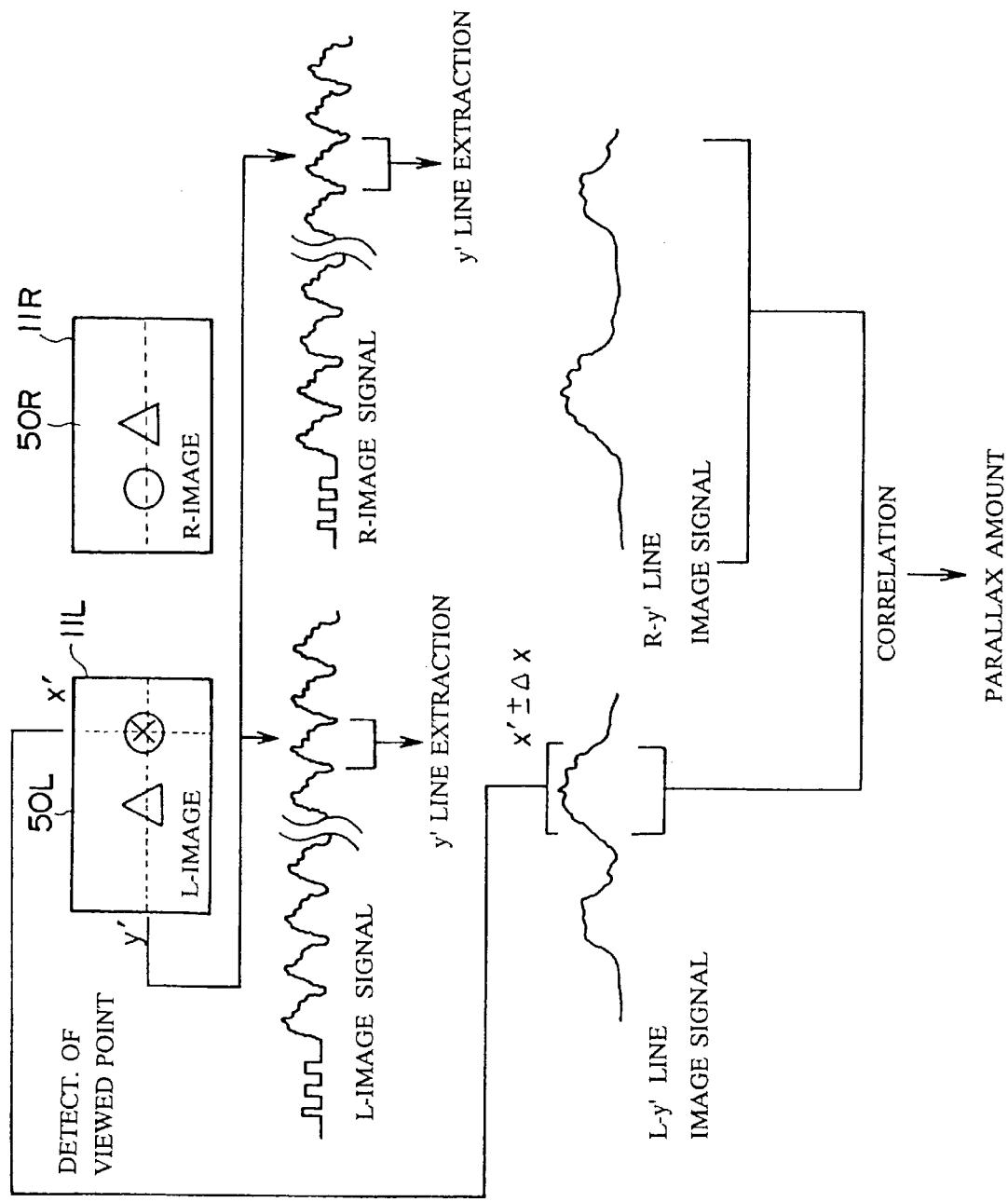
FIG. 2 is a schematic view for describing the line signal extraction and correlation calculation in the parallax reading means 40 in the apparatus shown in FIG. 1.

FIG. 2 is a schematic view for describing the line signal extraction and correlation calculation in the parallax reading means 40 in the apparatus shown in FIG. 1.

As shown in the top portion of FIG. 2, right eye and a left eye images 50R and 50L containing a triangular pyramid and a sphere, are displayed on the right eye and left eye LCDs 11R and 11L. It is assumed that the viewer's left eye is viewing the sphere as shown by the cross mark. The point being viewed is detected by a known manner by the eyesight detector 18 to determine the coordinates (x', y') of its position.

Then, as shown in the middle portion of FIG. 2, a plurality of line signals centered on line y' are extracted from each of the right eye and left eye image signals. For the brevity of the description, FIG. 2 shows an example, in which the sole line y' of signal is extracted. Thus, a horizontal line video signal corresponding to the vertical coordinate y' in the coordinates; (x', y') is extracted as a left y' line and a right y' line image signal. The correlation between the left y' line and right y' line image signals extracted in the above way, is calculated with respect to the horizontal coordinate x' in the coordinates (x', y'). As an example, of the left y' line video signal a signal in a section ±Δx centered on x' is taken to calculate the correlation between it and the right y' line image signals. Specifically, with respect to a left eye image portion at the horizontal coordinate x', the time difference of a portion, i.e., a most highly correlated portion, of the right eye image is detected, and the amount of parallax is determined from the calculated time difference. A shift amount calculator calculates the necessary shift amount according to the data thus obtained.

In the embodiment of the apparatus according to the present invention described with reference to FIGS. 1 and 2, the parallax reading means 40 (correlation calculator 46), address converter 47, memory 48, image shifters 32R and 32L and right eye and left eye LCD drivers 33R and 33L serve together for a control operation to vary the right eye and left eye images with a binocular parallax therebetween such that the binocular parallax is substantially fixed in effect by horizontally shifting the images on the right eye and left eye LCD drivers 33R and 33L by the necessary shift amount as noted above.

Figure 3:
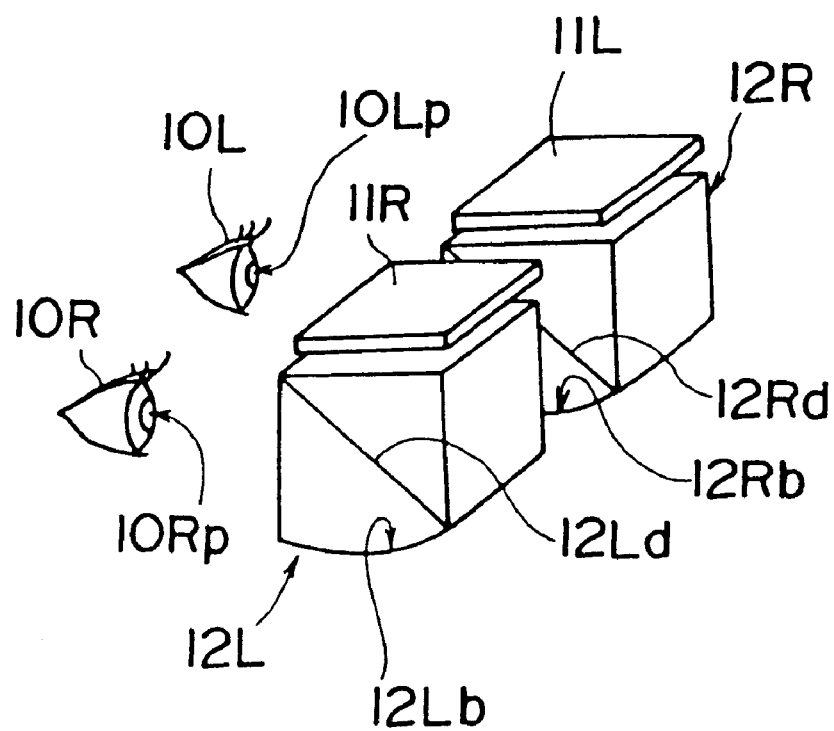
FIG. 3 is a perspective view showing the detailed construction of optical systems for displaying image as an essential element in the embodiment shown in FIG. 1.

FIG. 3 is a perspective view showing the detailed construction of optical systems for displaying image as an essential element in the embodiment shown in FIG. 1. An optical system for the right eye will first be described. The system comprises the right eye eyepiece optical system 12R, which is a prism having a convex mirror 12Rb as a bottom inner surface and a substantially diagonally provided inner central half mirror 12Rd. An image on the right eye LCD 11R as an image display element is incident on the corresponding top surface of the prism 12R, then transmitted through the half mirror 12Rd, and then reflected by the convex mirror 12Rb on the bottom inner surface of the prism. The reflected light is reflected by the lower surface of the half mirror 12Rd to the left side of the prism in the figure and incident on the right eye 10R from the pupil 10Rp to form a virtual image on the retina.

An optical system for the left eye is line symmetric to the optical system for the right eye described above, and will be understood from the figure by replacing "R" in the reference symbols in the detecting system for the right eye with "L".

One feature (or element) of the present invention resides in shading-off means, which shades off in effect edge portions (i.e., frames and the neighborhood thereof) of the displays areas of the left eye and right eye images with a binocular parallax therebetween as noted before. For example, as shown in FIG. 8(b), the image display are provided to the viewer has shaded-off or gradated edge portions. As this constitution, various elements described in Japanese Laid-Open Patent Publication Heisei 7-325266 (hereinafter referred to as proposal publication) by the present applicant.

Some of the elements described in the proposal publication which are recommendable for application to the present invention, will be briefly described hereinunder by providing like reference symbols to parts like those shown in FIG. 3.

Figure 4:
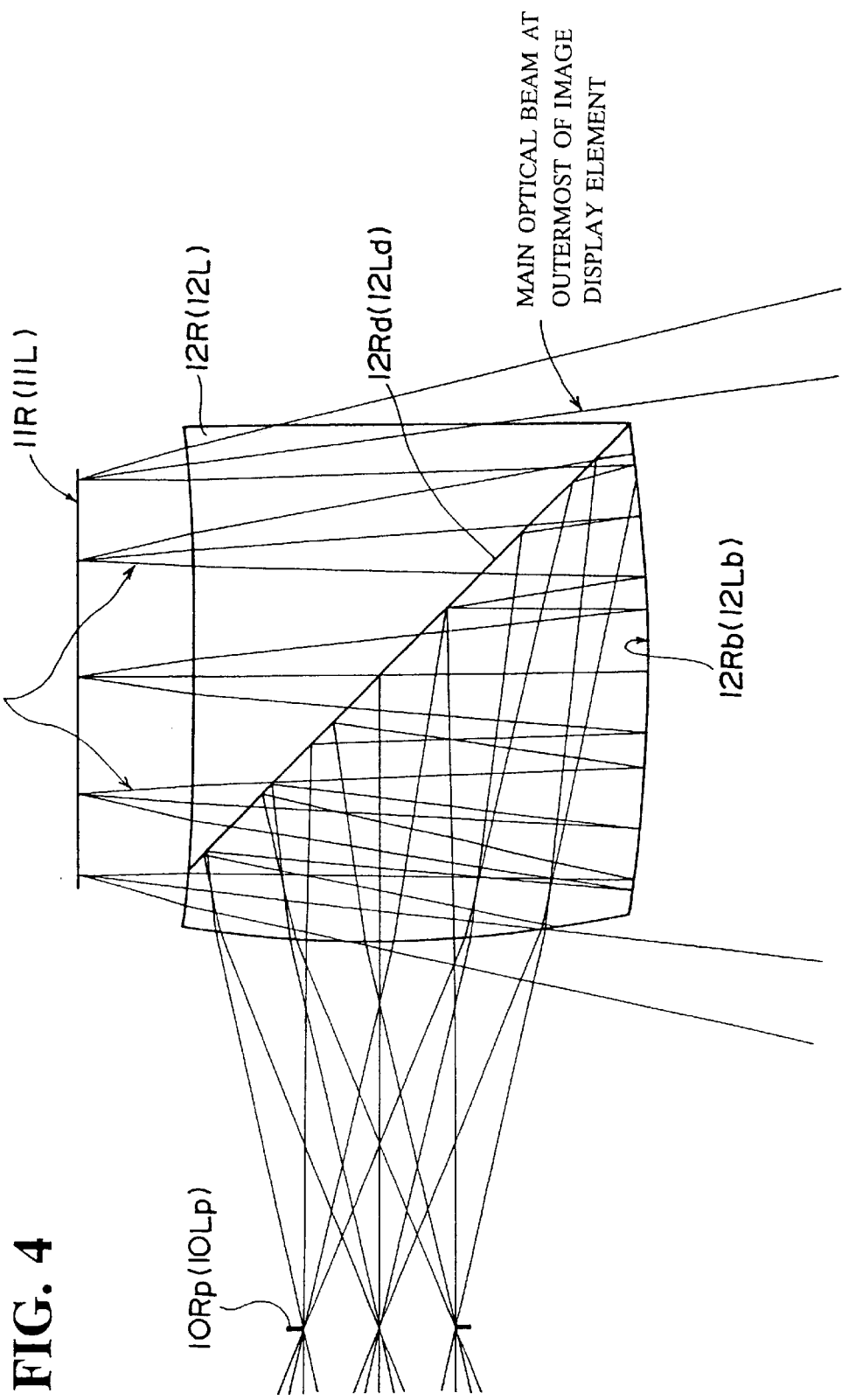
FIG. 4 is an optical path diagram showing an example of eyepiece optical system, in which the optical systems shown in FIG. 3 function as shading-off means.

FIG. 4 is an optical path diagram showing an example of eyepiece optical system, in which the optical systems shown in FIG. 3 function as shading-off means. In the proposal publication, this system is described as Embodiment 1 on the basis of FIG. 4.

Referring to FIG. 4, in order to lead an image light flux from the right eye (or left eye) LCD 11R (or 11L) as image display element to the viewer's right eye (or left eye) pupil 10Rp (or 10Lp), a beam splitter prism 12R (or 12L) is provided, which has an inclined half mirror 12Rd (or 12Ld) disposed at the intersection between the optical axis of the LCD 11R (or 11L) and the viewer's eyesight axis. The beam splitter prism 12R (or 12L) has a convex mirror 12Rb (or 12Lb) at the bottom. An image light flux from the LCD 11R (or 11L) is incident on the top surface of the beam splitter prism 12R (or 12L), then transmitted through the half mirror 12Rd (or 12Ld) and then reflected by the convex mirror 12Rb (12Lb) as the bottom inner surface of the prism. The reflected light flux is reflected by the lower surface of the half mirror 12Rd (or 12Ld) and incident on the right eye (or left eye) pupil 10Rp (or 10Lp) to form a virtual image on the retina.

Specifications of this optical system are that a 1.3-inch LCD is used, satisfactory image-focusing angles are 35° horizontal and 26.6° vertical, and viewing angles are 58° horizontal and 44.2° vertical (the satisfactory image-focusing angles being about 60% of the viewing angles).

With a prism size of 29|–x24|–x27|—the main optical axis of the light fluxes along the edges of the right eye (or left eye) LCD 11R (or 11L) as the image display element is not projected onto the viewer's eye. That is, edge portions (i.e., frames and the neighborhood thereof) of the display areas of the left eye and right eye images are shaded off in effect.

Figure 5:
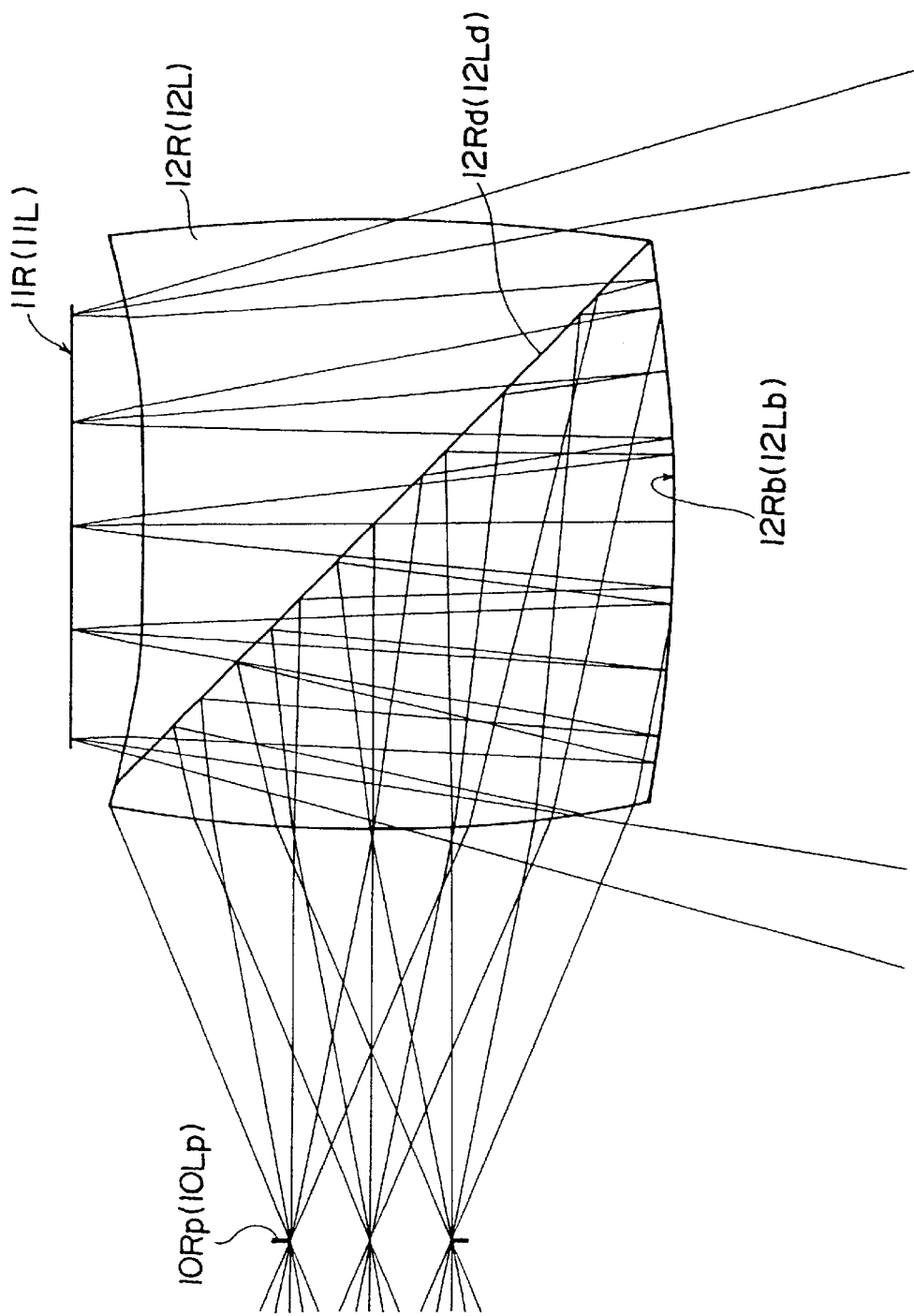
FIG. 5 is an optical path diagram showing another example of the eyepiece optical system, in which the optical systems shown in FIG. 1 function as shading-off means.

FIG. 5 is an optical path diagram showing another example of the eyepiece optical system, in which the optical systems shown in FIG. 1 function as shading-off means. In the proposal publication, this system is described as Embodiment 6 on the basis of FIG. 9.

With reference to FIG. 5, like the example shown in FIG. 4, in order to lead an image light flux from the right eye (or left eye) LCD 11R (or 11L) as image display element to the viewer's right eye (or left eye) pupil 10Rp (or 10Lp), a beam splitter prism 12R (or 12L) is provided, which has an inclined half mirror 12Rd (or 12Ld) disposed at the intersection between the optical axis of the LCD 11R (or 11L) and the viewer's eyesight axis. The beam splitter prism 12R (or 12L) has a convex mirror 12Rb (or 12Lb) at the bottom. An image light flux from the LCD 11R (or 11L) is incident on the top surface of the beam splitter prism 12R (or 12L), then transmitted through the half mirror 12Rd (or 12Ld) and then reflected by the convex mirror 12Rb (or 12Lb) as the bottom inner surface of the prism. The reflected light flux is reflected by the lower surface of the half mirror 12Rd (or 12Ld) and incident on the right eye (or left eye) pupil 10Rp (10Lp) to form a virtual image on the retina.

Specifications of this optical system are that a 1.3-inch LCD is used, satisfactory image-focusing angles are 30° horizontal and 23° vertical, and viewing angles are 60° horizontal and 47° vertical (the satisfactory image-focusing angles being about 50% of the viewing angles).

In this example, the end surface (or to surface) of the prism 12R (or 12L) on the side of the right eye (or left eye) LCD 11R (or 11L) as the image display element is a non-spherical surface such that the convex power is increased as one goes away from the optical axis and changed to convex power as one goes outward from a certain position.

By the provision of the above non-spherical surface, the following effect is obtainable.

(1) Within the satisfactory angle a negative distortion generated in the convex mirror 12Rb (or 12Lb) is corrected to −5% or below, and outside the satisfactory angle a great negative distortion is generated, thus permitting a broad angle to be readily secured. (In the forward pursuit the distortion is positive, although it is negative in the backward pursuit.)

(2) The angle between the main optical axis of the edges of the right eye (or left eye) LCD 11R (or 11L) as the image display element and the image display element is increased, thus darkening the image of the image display element edges (i.e., controlling the inclination of the main optical axis of the eyepiece optical system). The inclination angles of the main optical axis in the long sides, short sides and diagonal of the LCD are as follows.

Inclination angle of the main optical axis in the long sides of LCD: 14°

Inclination angle of the main optical axis in the short sides of LCD: 7°

Inclination angle of the main optical axis in the diagonal of LCD: 35°

(3) Astigmatism and coma (internal coma) are generated to deteriorate the resolution in the edge portions of the image display area and thin off the boundary between the image and non-image areas.

(The image-focusing performance of the eyepiece optical system is deteriorated in the edge portions of the image display area.)

By applying the optical system shown in FIG. 5, with the above effects the frames of the display area of the left and right images are shaded off.

Figure 6:
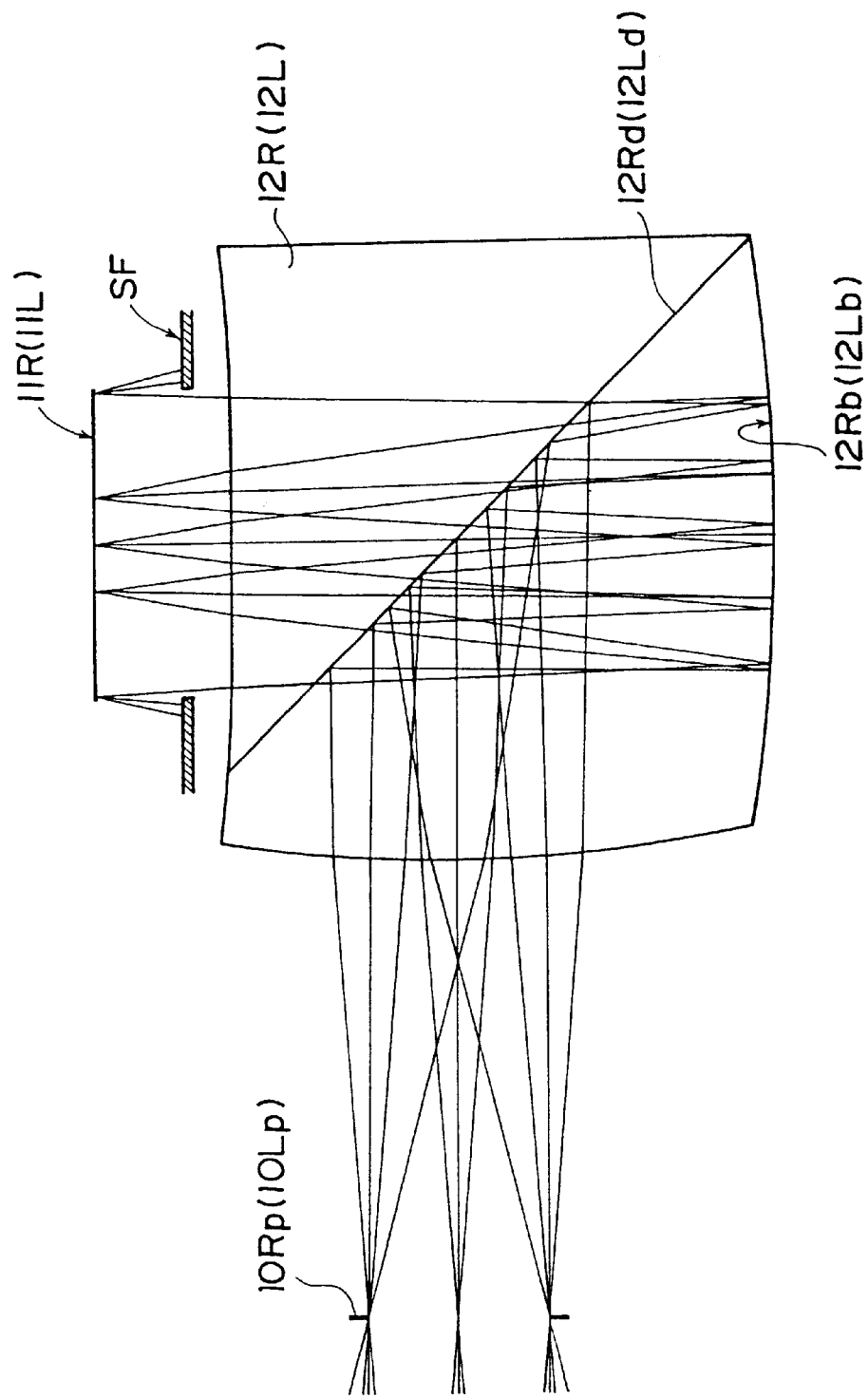
FIG. 6 is an optical path diagram showing a further example of the eyepiece optical system, in which the optical systems shown in FIG. 3 function as shading-off means.

FIG. 6 is an optical path diagram showing a further example of the eyepiece optical system, in which the optical systems shown in FIG. 3 function as shading-off means. In the proposal publication, this system is described as Embodiment 7 on the basis of FIG. 10.

Referring to FIG. 6, like the example shown in FIG. 4, in order to lead an image light flux from the right eye (or left eye) LCD 11R (or 11L) as image display element to be viewer's right eye (or left eye) pupil 10Rp (or 10Lp), a beam splitter prism 12R (or 12L) is provided, which has an inclined half mirror 12Rd (or 12Ld) disposed at the intersection between the optical axis of the LCD 11R (or 11L) and the viewer's eyesight axis. The beam splitter prism 12R (or 12L) has a convex mirror 12Rb (or 12Lb) at the bottom. An image light flux from the LCD 11R (or 11L) is incident on the top surface of the beam splitter prism 12R (or 12L), then transmitted through the half mirror 12Rd (or 12Ld) and then reflected by the convex mirror 12Rd (or 12Ld) as the bottom inner surface of the prism. The reflected light flux is reflected by the lower surface of the half mirror 12Rd (or 12Ld) and incident on the right eye (or left eye) pupil 10Rp (or 10Lp) to form a virtual image on the surface.

Specifications of this optical system are that a 1.3-inch LCD is used, satisfactory image-focusing angles are 12° horizontal and 9° vertical, and viewing angles are 38° horizontal and 29° vertical, (the satisfactory image-focusing angles being about 32% of the viewing angles).

In this example, a light-blocking frame SF having a similar shape to that of the edges of the LCD 11R (or 11L) is used to prevent the main light flux of the light fluxes from the edges of the LCD 11R (or 11L) from reaching the viewer's eye.

When the light-blocking frame SF is located at the position of the LCD 11R (or 11L), it serves as visual field stop, and its shape is projected onto the eye. For this reason, the light-blocking frame SF should be located at a position spaced apart from the LCD 11R (or 11L) by more than the depth-of-focus. Preferably, the light-blocking frame SF is located at a position spaced apart from the LCD by more than 20 times the depth-of-focus. By so doing, the effect of shading-off can be further increased. Furthermore, by increasing the size of the light-blocking frame SF the light fluxes from the edges of the LCD 11R (or 11L) can be perfectly blocked.

FIG. 7 is an optical path diagram showing a further example of the eyepiece optical system, in which the optical systems shown in FIG. 3 function as shading-off means. In the proposal publication, this system is described as Embodiment 13 on the basis of FIG. 14.

With reference to FIG. 7, like the example shown in FIG. 4, in order to lead an image light flux from the right eye (or left eye) LCD 11R (or 121L) as image display element to the viewer's right eye (or left eye) pupil 10Rp (or 10Lp), a beam splitter prism 12R (or 12L) is provided, which has an inclined half mirror 12Rd disposed at the intersection between the optical axis of the LCD 11R (or 11L) and viewer's eyesight axis. The beam splitter prism 12R (or 12L) has a convex mirror 12Rb (or 12Lb) at the bottom. An image light flux from the LCD 11R (or 11L) is incident on the to surface of the beam splitter prism 12R (or 12L), then transmitted through the half mirror 12Rd (or 12Ld) and then reflected by the convex mirror 12Rd (12Ld) as the bottom inner surface of the prism. The reflected light flux is reflected by the lower surface of the half mirror 12Rd (or 12Ld) and incident on the right eye (or left eye) pupil 10Rp (10Lp) to form a virtual image on the retina.

In this example of FIG. 7, the portion of the convex mirror 12Rb (12Lb) which is coated on the bottom portion of the beam splitter 12R (12L) is limited to the portion A smaller than the entire bottom portion and other portion around there is transparent or light absorption portion.

Specifications of this optical system are that a 1.3-inch LCD is used, satisfactory image-focusing angles are 12° horizontal and 9° vertical, and viewing angles are 38° horizontal and 29° vertical (the satisfactory image-focusing angles being about 32% of the viewing angles).

In the example of FIG. 7, the outside portion of the outermost portion is not mirror-coated to prevent the main optical beam of the outermost portion from incident to the viewer's eyes. The limitation of the mirror-coat portion completely cut the optical beam of the outermost portion.

Thus the main optical beam of the outermost portion of the right eye and left eye LCDs 11R and 11L as the image display element is not incident to the viewer's eyes, making shade-off in effect for the edge portion and neighborhood thereof of the display portion corresponding to the left eye and right eye images.

Figure 8A:
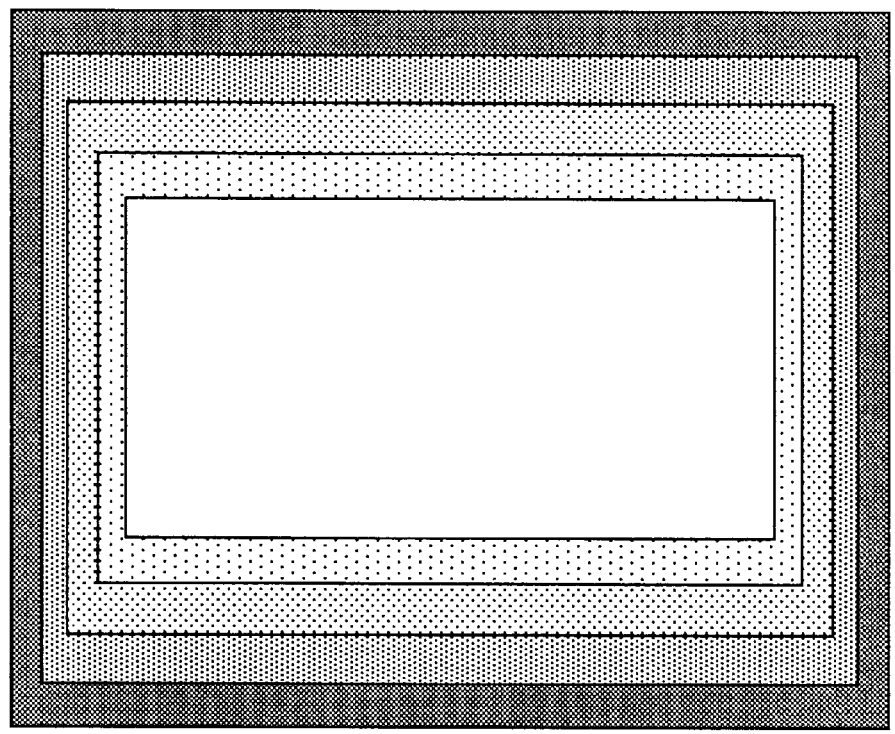
FIGS. 8(a) and 8(b) are views showing optical elements of a further example of the optical system, in which the optical systems shown in FIG. 3 function as shading-off means.
Figure 8B:
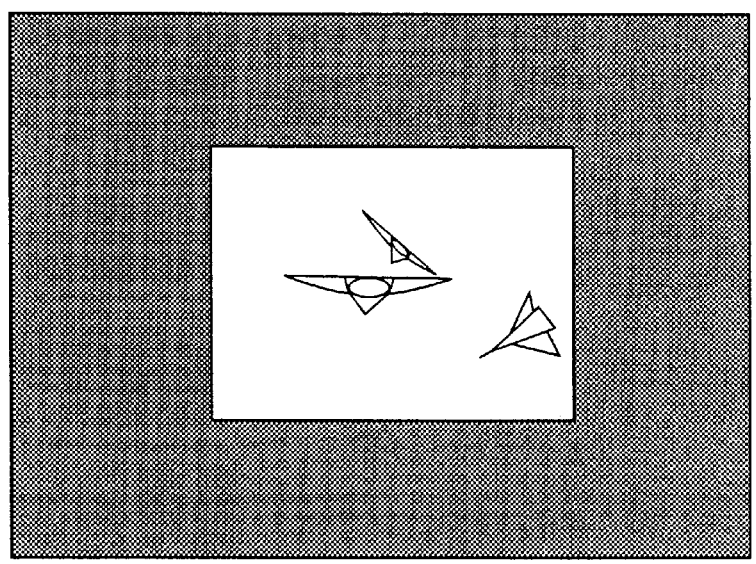

FIGS. 8(a) and 8(b) are views showing optical elements of a further example of the optical system, in which the optical systems shown in FIG. 3 function as shading-off means. The element shown in FIG. 8(a) is described in the proposal publication as Embodiment 9 on the basis of FIG. 12. In the element shown in FIG. 8(a), the light transmittivity is reduced stepwise toward the edges.

In the element shown in FIG. 8(b), the light transmittivity is reduced continuously toward the edges. Such a light-blocking member is disposed between the right eye (or left eye) LCD 11R (or 11L) as the image display element in the optical systems shown in FIG. 3 and an illuminating system (not shown) behind the LCD for illumination light intensity control to darken and make obscure the image of image display area edges. Edge portions (i.e., frames and the neighborhood thereof) of the display areas of the left eye and right eye images are thus shaded off in effect.

Figure 9A:
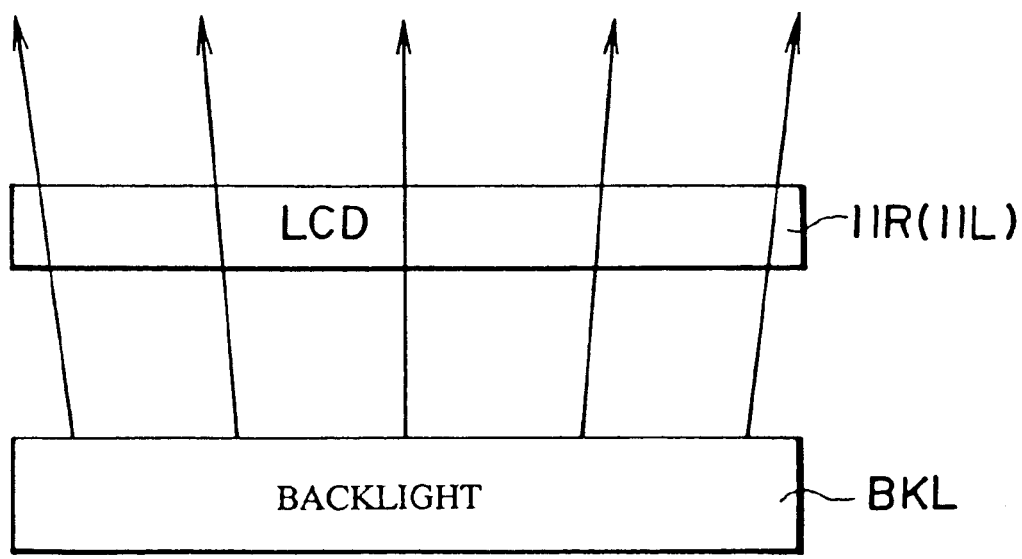
FIGS. 9(a) and 9(b) a views showing the disposition of an optical element in a further example of the example, in which the optical systems shown in FIG. 3 function as shading-off means.
Figure 9B:
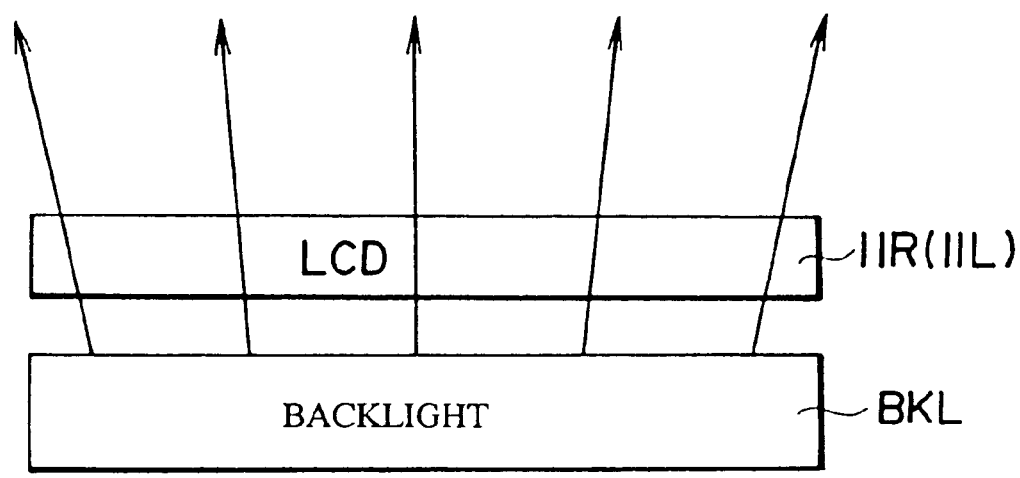

FIGS. 9(a) and 9(b) are views showing the disposition of an optical element in a further example of the example, in which the optical systems shown in FIG. 3 function as shading-off means. In the proposal publication, this system is described as Embodiment 10 on the basis of FIG. 19.

Usually, as shown in FIG. 9(b), a backlight BKL is disposed in the proximity of an LCD used as image display element. In this example, as shown in FIG. 9(a), the backlight BKL is disposed such that it is far apart from the LCD. This disposition has an aim of positively generating illumination irregularities with respect to the LCD 11R (or 11L) to relatively darken the image of the edge portions of the LCD as the image display element. Edge portions (i.e., frames and the neighborhood thereof) of the areas of display of the left and right eye images are thus shaded off in effect.

Figure 10:
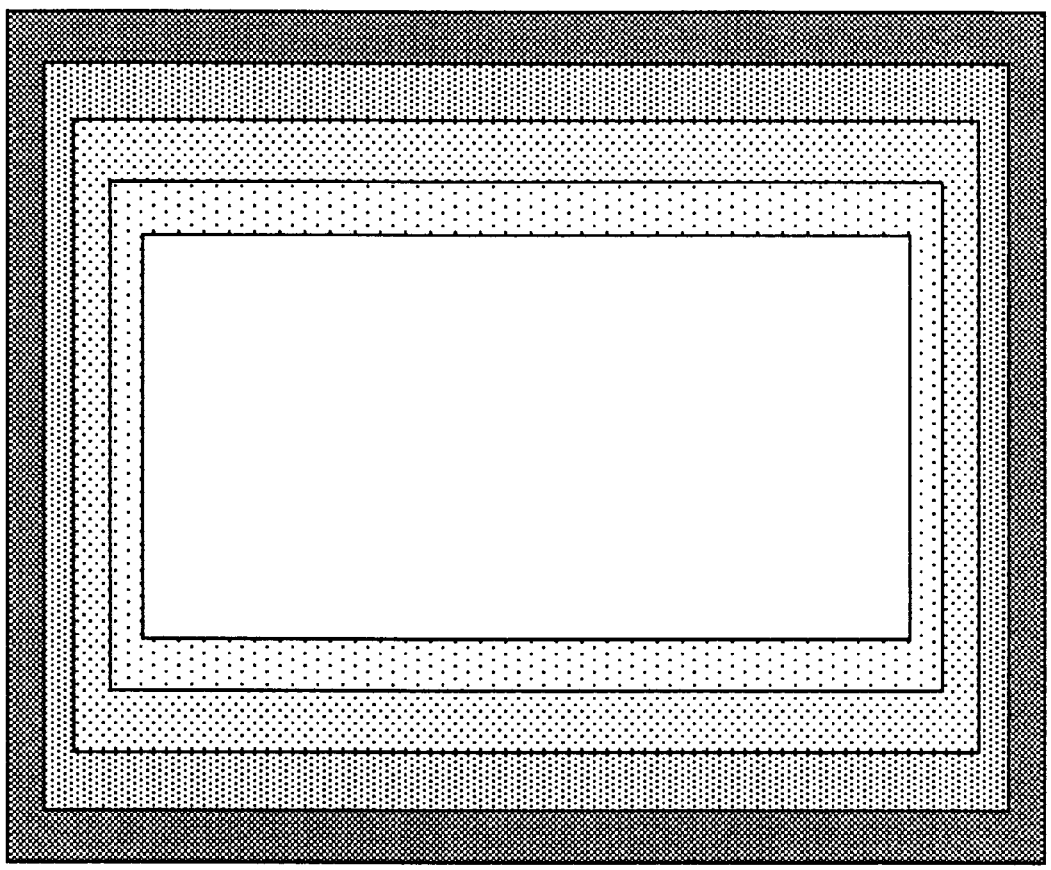
FIG. 10 is a view showing an optical element in a further example of the optical system, in which the optical systems shown in FIG. 3 function as shading-off means. In the proposal publication.

FIG. 10 is a view showing an optical element in a further example of the optical system, in which the optical systems shown in FIG. 3 function as shading-off means. In the proposal publication, this system is described as Embodiment 13 on the basis of FIG. 16.

The element shown in FIG. 10 is a diffuser, the diffusing effect of which is increased step-wise as one goes toward the edges. As in the case of the light-blocking member shown in FIG. 8(b), it is possible to arrange such that the diffusing effect is increased continuously as one goes toward the edges. This diffuser is disposed between the right eye (or left eye) LCD 11R (or 11L) as the image display element and the beam splitter prism 12R (or 12L) in the optical systems shown in FIG. 13 to darken and made obscure the image of the image display area edges. Edge portions (i.e., frames and the neighborhood thereof) of the areas of display of the left and right eye images are thus shaded off in effect. It is possible to dispose the diffuser at a suitable position on the optical path in the beam splitter prism 12R (or 12L).

Figure 11:
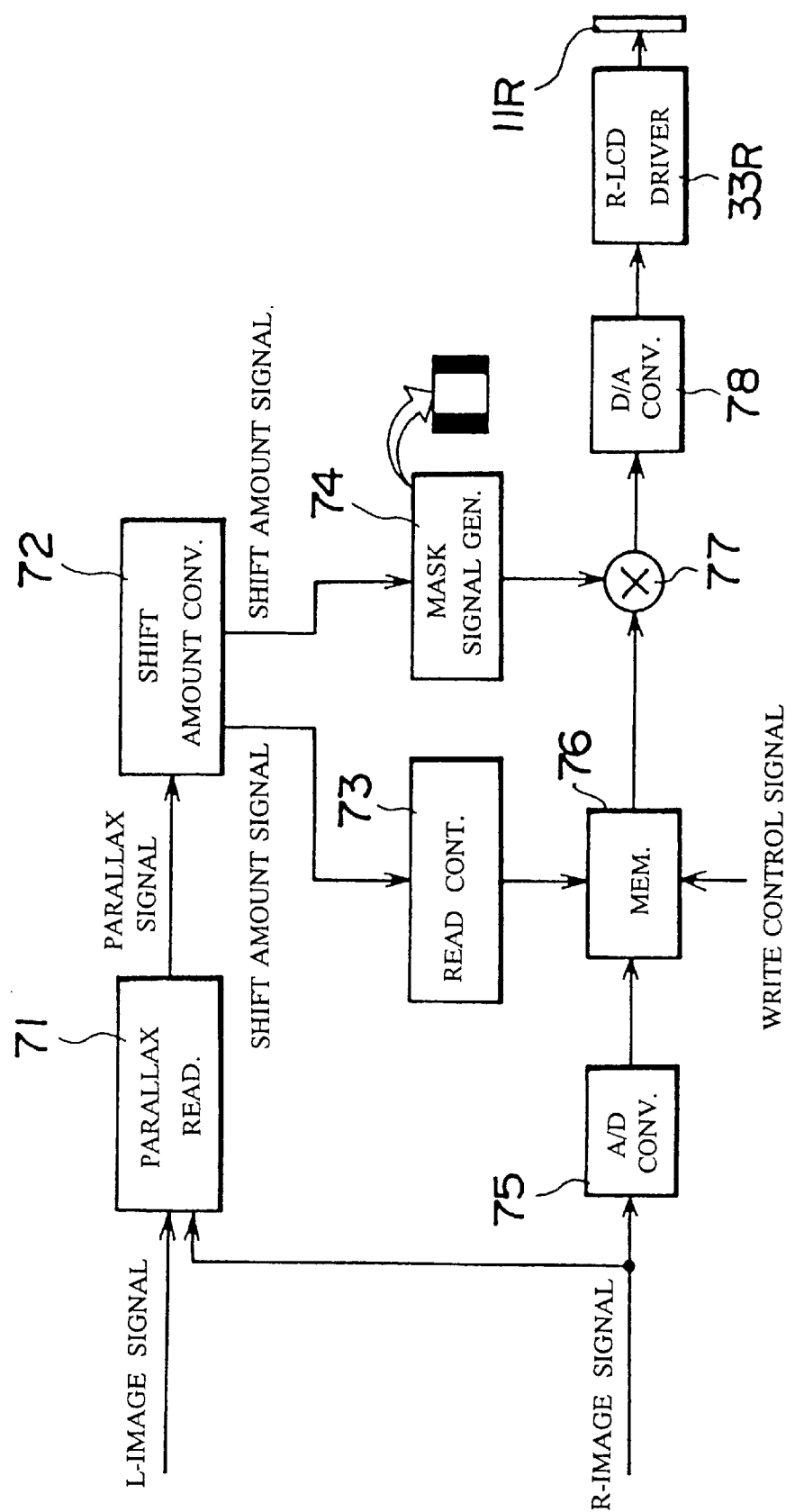
FIG. 11 is a block diagram showing a right eye image system in a different embodiment of the present invention.

FIG. 11 is a block diagram showing a right eye image system in a different embodiment of the present invention. While FIG. 11 shows only the right eye image system, the embodiment also comprises a left eye image system which is alike in construction.

A right eye and a left eye image signal as described before in connection with FIGS. 19(a) to 19(c), are coupled to a parallax reading circuit 71. According to the two image signals, the parallax reading circuit 71 forms a parallax signal representing a parallax concerning the left and right eye images. The parallax signal is coupled to a shift amount converter 72. The shift amount converter 72 derives an adequate shift amount (i.e., shift amount of the horizontal positions of images or control of left and right masking widths of the LCD display areas) corresponding to the parallax value represented by the parallax signal, and generates a shift amount signal representing an image shift amount. The shift amount signal is coupled to a read controller 73 and also to a masking signal generator 74.

The right eye image signal (which is an analog signal), is also coupled to an A/D converter 75. The output signal (i.e., right eye digital image signal) from the A/D converter 75 is written in a memory 76 under control of an externally provided write control signal. The right eye digital image signal thus written in the memory 76 is read out under control of a read control signal, which is generated in the read control signal 73 in correspondence to the shift amount signal. The right eye digital image signal read out from the memory 76 represents a right eye image as shown in FIGS. 21(a) to 21(c) which is in a proper horizontal position in the display area. This signal is coupled as one input to a mixer 77. As the other input to the mixer 74 is coupled a masking signal, which is generated in the masking signal generator 74 in correspondence to the shift amount signal. The masking signal prescribes the form (i.e., width) of a left and a right masking portion of the LCD display area as schematically shown on the right side of the block 74 in FIG. 11.

The mixer 77 mixes together the two inputs, i.e., the right eye digital image signal read out from the memory 76, and the masking signal from the masking signal generator 74, to form a digital image signal which represents an image on the display area with the left and right sides masked by an adequate width, i.e., an image on the display area with the left and right edges and neighborhood thereof in monochrome display, such as black display (as will be described later with reference to FIGS. 12(a) to 12(c). This signal is coupled to the D/A converter 78. The D/A converter 78 generates an analog image signal, which is coupled to an LCD driver 33R. The LCD driver 33R drives LCD 11R for displaying the right eye image according to the right eye analog image signal coupled thereto.

A left eye image system likewise comprises an A/D converter 75, a memory 76, a mixer 77 and a D/A converter 78. The output of the D/A converter in this system is coupled to a left eye LCD driver 33L to drive the left eye LCD 11L and display the left eye image (see FIG. 1).

FIGS. 12(a) to 12(c) are views for describing the control operation of the width of masking (i.e., converted area of the left and right edges and neighborhood thereof of the image display areas into predetermined monochrome display, such as black display) in the embodiment described before in connection with FIG. 11.

The image shown in FIGS. 12(a) to 12(c), like those shown in FIGS. 21(a) to 21(c) and 22, includes a sphere and a triangular pyramid. The sphere is becoming closer while the triangular pyramid is becoming far away from the viewer in the order of FIGS. 12(a) to 12(c). As is seen from the figures, the width of the monochrome display parts is controlled such that it is increased on the right side of the display area and reduced on the left side when position of the image on the display area is shifted to the left, while it is increased on the left side of the display area and reduced on the right side when the image position is shifted to the right.

The width WLL of the monochrome part of the left eye display area, i.e., the left edge and neighborhood thereof of the display area, is regulated to be greater than the width WLR of the monochrome part of the same image display area, i.e., the right edge and neighborhood thereof of the display area. Likewise, the width WLL of the monochrome part of the right eye image display area, i.e., the right edge and neighborhood thereof of the display area, is regulated to be greater than the width WLR of the monochrome part of the same display area, i.e., the left edge and neighborhood of the display area.

Figure 13A:
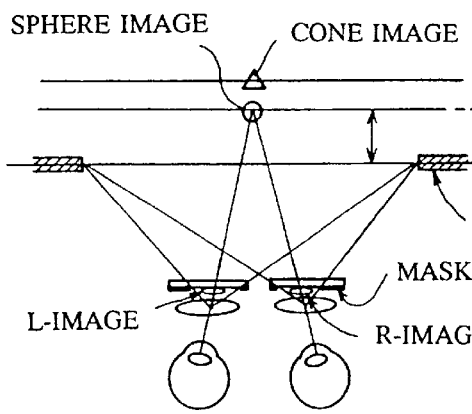
FIGS. 13(a) to 13(c) are views for describing how masked images are seen.
Figure 13B:
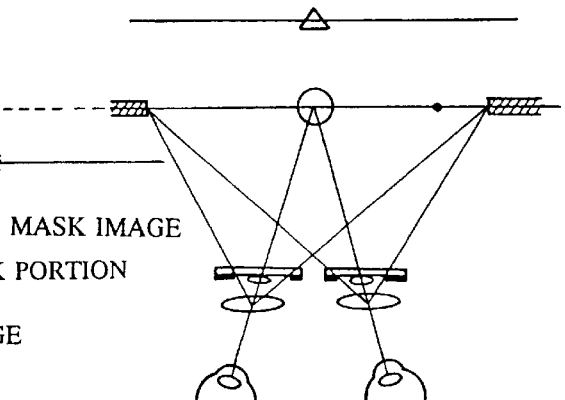
Figure 13C:
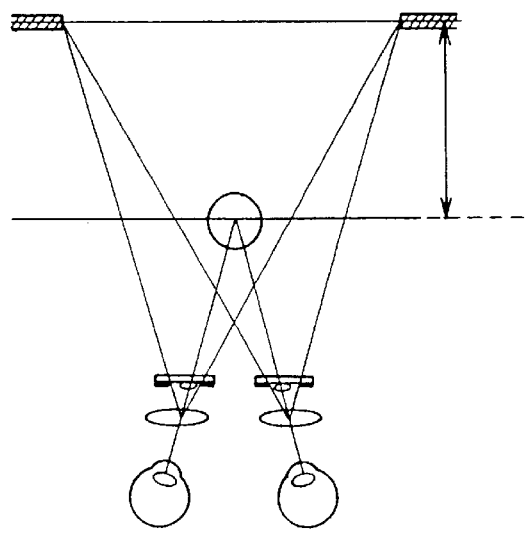

FIGS. 13(a) to 13(c) are views for describing how masked images (with monochrome parts) are seen.

FIGS. 13(a) to 13(c) correspond to FIGS. 12(a) to 12(c). As shown, the position of the masked parts (i.e., monochrome parts) of images (i.e., position of edge portions of the images), is changed from a close position to a distant position with changes in the masking width. Thus, even with the presence of the masked parts in the viewer's visual field, the viewer's sense as though he or she is actually on the side of the image scene is enhanced with respect to the approaching motion of the sphere (in the depth direction).

Figure 14:
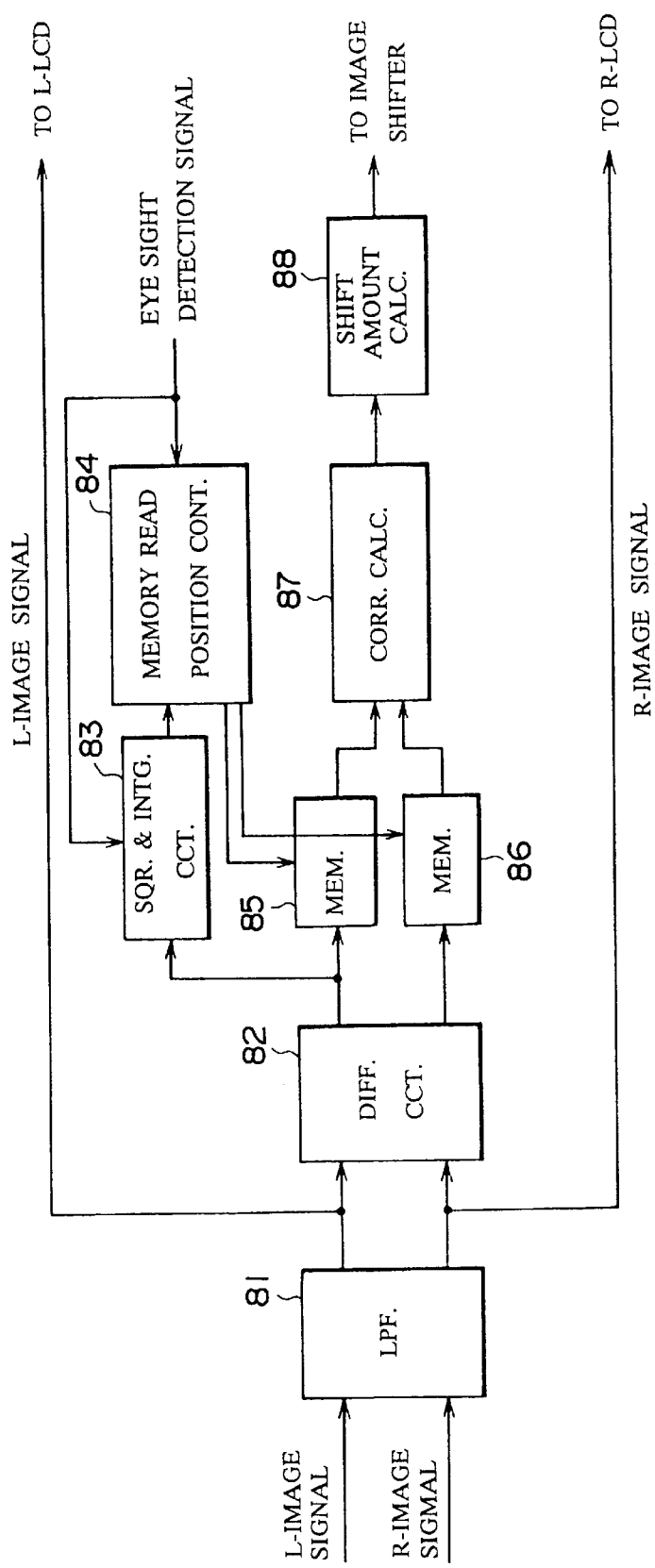
FIG. 14 is a block diagram showing a further embodiment of the present invention.

FIG. 14 is a block diagram showing a further embodiment of the present invention.

The left eye and right eye image signals from the image reproducing unit shown in FIG. 1 are coupled to a low-pass filter 81 for smoothing and high frequency noise removal. The smoothed left eye and right eye image signals outputted from the low-pass filter 81 are coupled to the respective left eye and right eye LCDs noted above and also to a differential circuit 82. The differential circuit 82 differentiates the two input image signals and extracts signals corresponding to edge portions of images. Of the output signals of the differential circuit 82, that which is of the left eye image signal system is coupled to a squaring and integrating circuit 83. The squaring and integrating circuit 83 first squares the output of the differentiating circuit 82, which is a signal comprising both positive and negative components (i.e., differential components corresponding to rising and falling edges). The squared signal comprises positive components only. The circuit 83 then integrates the squared signal for each predetermined time section. The integrated value becomes greater as the frequency of appearance of differential peaks in the predetermined time section increases. Consequently, the output of the squaring and integrating circuit 83 has a greater value for a finer image in the areas corresponding to the predetermined time section and for a higher the mean spacial frequency. A parallax detection signal representing the position viewed by the viewer is coupled to the squaring and integrating circuit 83. The above predetermined time section for the integration is selected such that it is matched to the viewer's viewed position represented by the detection signal.

The output of the squaring and integrating circuit 83 is coupled to a memory read position controller 84 as the next stage. The eyesight detection signal representing the viewer's viewed position, which is obtained by the eyesight detecting means such as the eyesight detector 18 described before in connection with FIG. 1 and coupled to the squaring and integrating circuit 83, is also coupled to the memory read position controller 84. The memory read position controller 84 determines the area of the window noted above according to the output signal of the squaring and integrating circuit 83, which is indicative of whether the spacial frequency is high or not. The window area to be correlation-detected between the left eye and right eye images is selected to be relatively small when the spacial frequency is relatively high. When the spacial frequency is relatively low, the window area is selected to be relatively large. In this embodiment, the window area is selected according to the parallax detection signal such as to match the center position of the window to the viewer's viewed position. In other words, the memory read position controller 84 outputs a signal representing the area and center position of the window.

The output of the differentiating circuit 82, i.e., the outputs of the left eye and right eye image systems, is stored in respective memories 85 and 86. An appropriate A/D converter is provided in an input section of or as a preceding stage to each of the memories 85 and 86. Data are read out from the memories 85 and 86 under control of the signal from the memory read position controller 84, representing the area and center position of the window. These read-out data which each correspond to an appropriate window area, are coupled to a correlation calculator 87 for deriving a parallax concerning the left eye and right eye images. The output of the correlation calculator 87, i.e., a parallax signal, is coupled to a shift amount calculator 88, which obtains a signal for appropriately shifting the images according to the difference between the present and desired parallax values. The output of the shift amount calculator 88 is coupled to the image shifters which were described before in connection with FIG. 1 for horizontal image position control concerning the left eye and right eye images.

Figure 15:
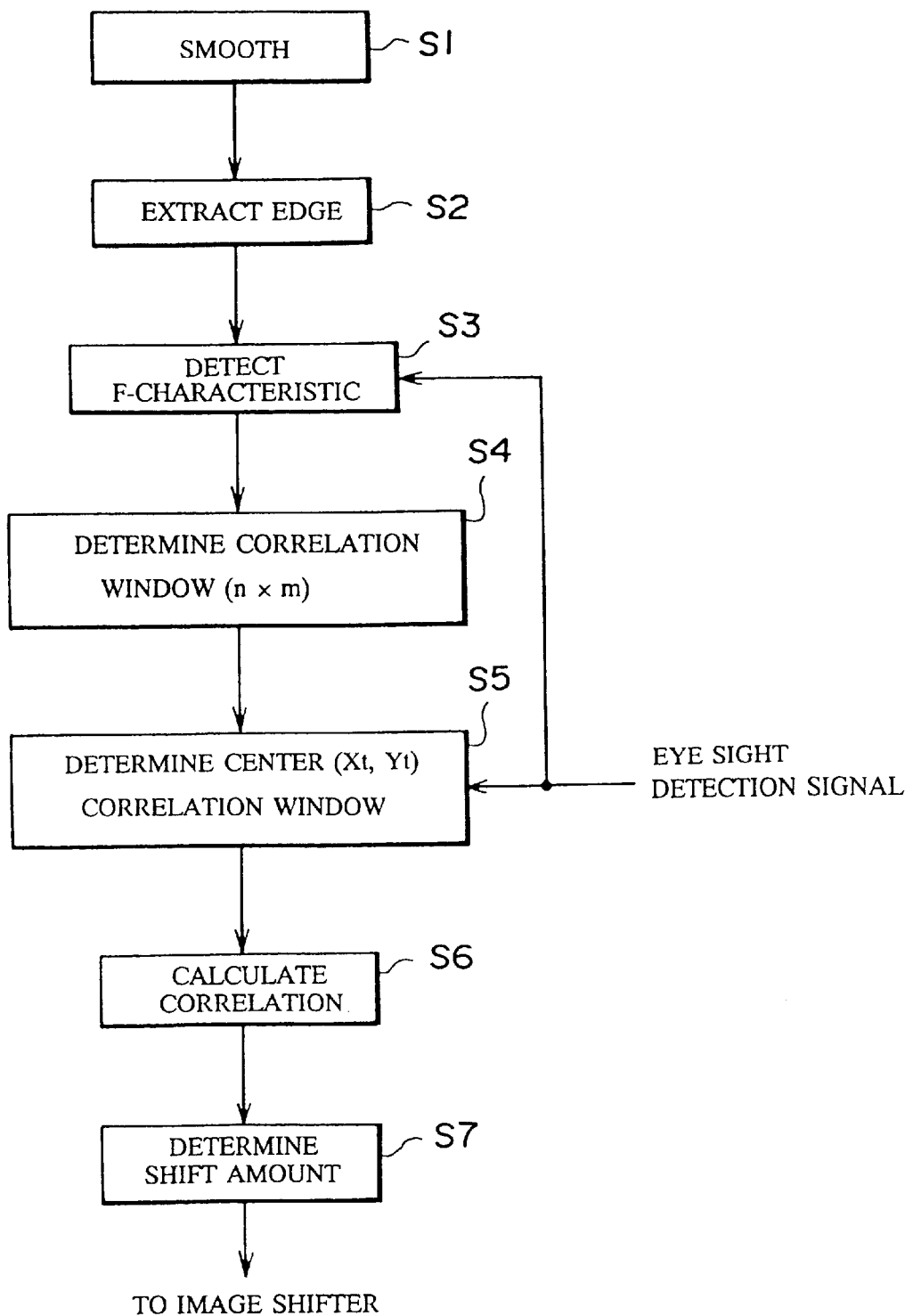
FIG. 15 is a flow chart for describing the operation of the embodiment shown in FIG. 14.
Figure 18:
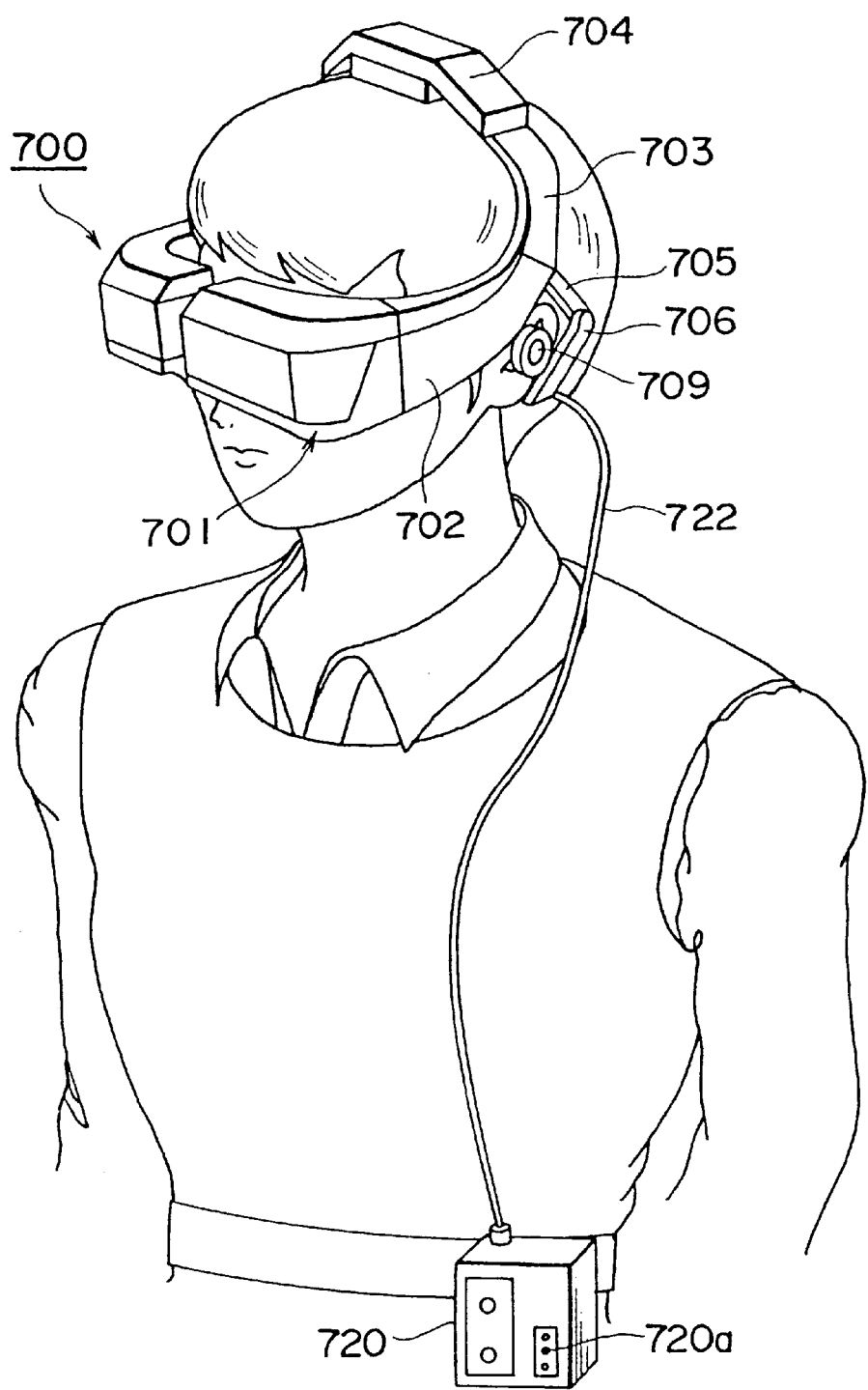
FIG. 18 is a perspective view showing a head-mounted display (HMD) 700 as an example of such stereo image display apparatus.
Figure 20:
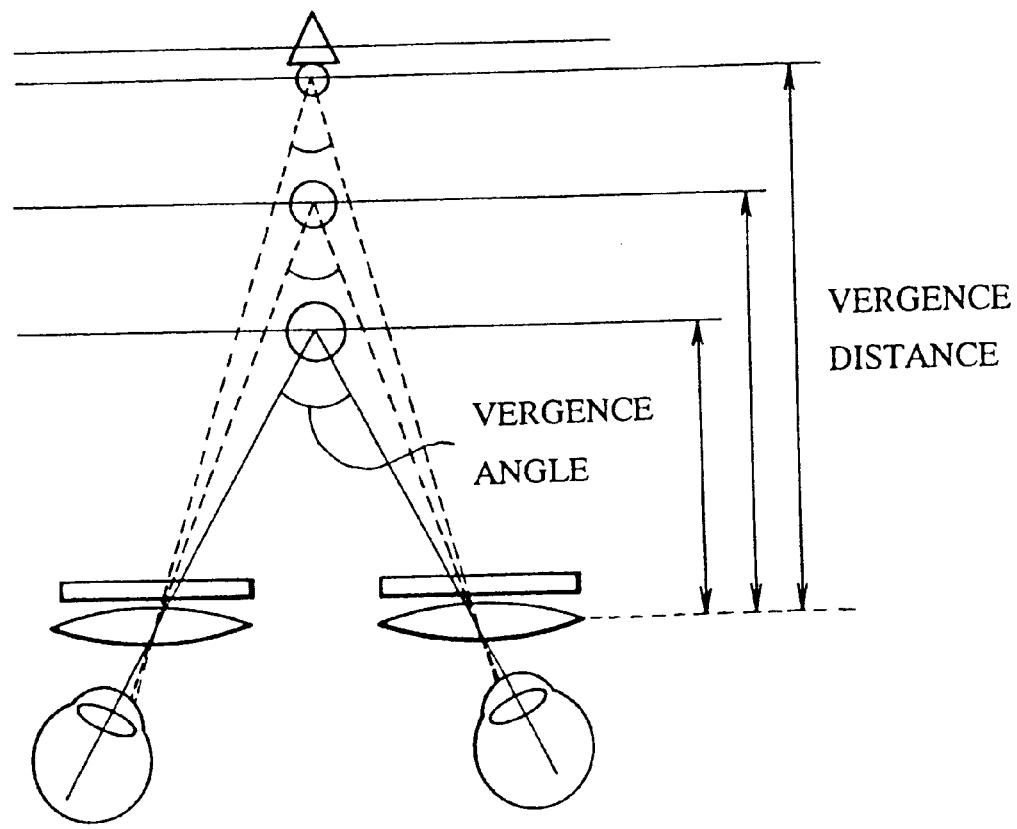
FIG. 20 shows the way in which the images shown in FIGS. 19(a) to 19(c) are viewed with the two eyes.

FIG. 15 is a flow chart for describing the operation of the embodiment shown in FIG. 14. The low-pass filter 51 smoothes and removes the high frequency noise components from the left eye and right eye image signals as its inputs (step S1). The two smoothed image signals are then subjected to edge extraction. More specifically, the differentiating circuit 82 differentiates the smoothed image signals to extract signals corresponding to image edges (step S2). Of these signals obtained as a result of the edge extraction, the squaring and integrating circuit 83 detects a frequency characteristic (i.e., discriminates whether the spacial frequency of the images is relatively high or not) (step S3). According to the result of the process in the step S3, the area of the correlation detection subject window is determined (step S4). In the step S4, the horizontal and vertical sizes n and m of the window may be determined according to the horizontal and vertical spacial frequencies, respectively.

After the window area determination in the step S4, the center position (Xt, Yt) of the window is determined (step S5). For the steps S3 and S5, the eyesight detection signal representing the position viewed by the viewer, which is obtained in the eyesight detecting means such as the eyesight detector 18 as described before in connection with FIG. 1, is supplied to the squaring and integrating circuit 83 and the memory read position controller 84 as described before in connection with FIG. 14. The correlation calculator 87 derives the parallax concerning the left eye and right eye images with respect to the window area, which has been specified in the processes of the steps S4 and S5 (step S6). The shift amount calculator 88 obtains a signal for appropriately shifting the images according to the result of the process in the step S6 (i.e., the parallax signal value) (step S7). The result of the process in the step S6 is coupled to the image shifters.

FIG. 16 is a view for describing the operation of determining the area and position of the window in the embodiment shown in FIG. 14. As described before in connection with the process in the step S4 in FIG. 15, the horizontal and vertical sizes n and m of the window are determined according to the horizontal and vertical spacial frequencies, respectively. Then, the center position (Xt, Yt) of the window is determined according to the eyesight detection signal representing the position viewed by the viewer, obtained in the eyesight detecting means such as the eyesight detector 18 described before in connection with FIG. 1 (step S5 in FIG. 15).

FIGS. 17(a) and 17(b) are views for describing the operation of the window area determination in the embodiment shown in FIG. 14. With a relatively complicated image (i.e., when the spacial frequency is relatively high), the window area is set to be small as shown by the dashed rectangle in FIG. 17(a). With a relatively simple image (i.e., when the spacial frequency is relatively low), the window area is set to be relatively large as shown by the dashed rectangle in FIG. 17(b). In the window area determination process described above in connection with the embodiment shown in FIG. 14, spacial frequency detection is made in effect with respect to images concerning the edges extracted in the edge extraction process (corresponding to image frames as shown in FIGS. 17(a) and 17(b).

As has been described in the foregoing, according to the present invention due considerations are given to the influence on the viewer viewing stereo image of edge portions of the display areas of the display means, i.e., boundaries of the image and non-image areas of the display means, thus permitting stereo image display which does not spoil the viewer's sense just like the viewer is actually on the site of the image scene. In addition, it is possible to obtain adequate detection of the correlation of the left eye and right eye images to each other.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A stereo image display apparatus, comprising;

a display unit adapted to display a left eye and a right eye image with a binocular parallax therebetween on respective predetermined display areas;

a spatial frequency detector constructed and arranged to detect a spatial frequency concerning the left eye or right eye image;

a correlation calculation area specifying unit constructed and arranged to specify a correlation calculation area according to the spatial frequency detected by the spatial frequency detector such that the specified correlation calculation area is smaller for a first detected spatial frequency than for a second detected spatial frequency, said first detected spatial frequency being larger than said second detected spatial frequency;

a correlation calculator constructed and arranged to calculate a correlation of the left eye and right eye images to each other with respect to the correlation calculation area specified by the correlation calculation area specifying unit; and a binocular parallax controller constructed and arranged to control the binoctular parallax in effect according to the result of the correlation calculation in the correlation calculator.

2. The stereo image display apparatus according to claim 1, further comprising a viewed point detector constructed and arranged to detect a point viewed by the viewer in the display areas of the display unit, the spatial frequency detector being operable to detect a spatial frequency of images with respect to the viewed point detected by the viewed point detector and the neighborhood thereof.

3. The stereo image display apparatus according to claim 1, wherein the correlation calculation area specifying unit specifies the horizontal size of the correlation calculation area to be smaller for a first detected horizontal spatial frequency than for a second detected horizontal spatial frequency said first detected horizontal spatial frequency being larger than said second detected spatial frequency, and/or specifies the vertical size of the correlation calculation area to be smaller for a first detected vertical spatial frequency than for a second detected vertical spatial frequency, said first vertical spatial frequency being larger than said second detected vertical spatial frequency.

4. The stereo image display apparatus according to claim 1, further comprising an edge extractor constructed and arranged to extract edge portions of at least either of the left eye and right eye images with a binocular parallax therebetween, the spatial frequency detector being operable to detect a spatial frequency concerning an image displayed with coupling of edge portions detected by the edge extractor.

* * * * *